United States Patent [19]

Gotou

[11] Patent Number: 4,692,646
[45] Date of Patent: Sep. 8, 1987

[54] ROTATING ELECTRIC MOTOR WITH REDUCED COGGING TORQUE

[75] Inventor: Makoto Gotou, Nishinomiya, Japan

[73] Assignee: Matsushita Electric Industrial Co., Ltd., Kadoma, Japan

[21] Appl. No.: 760,509

[22] Filed: Jul. 30, 1985

[30] Foreign Application Priority Data

Aug. 1, 1984 [JP] Japan ............................... 59-161866
Aug. 1, 1984 [JP] Japan ............................... 59-161867

[51] Int. Cl.$^4$ ............................................. H02K 3/00
[52] U.S. Cl. .................................... 310/184; 310/156; 310/198
[58] Field of Search ...................... 310/180, 184, 68 R, 310/156, 198, 207, 185, 46, 186, 259, 187, 216

[56] References Cited

U.S. PATENT DOCUMENTS

| | | | |
|---|---|---|---|
| 3,230,434 | 1/1966 | Bauerlein | 310/156 |
| 3,845,334 | 10/1974 | Harada | 310/46 |
| 4,127,787 | 11/1978 | Auinger | 310/184 |
| 4,130,769 | 12/1978 | Karube | 310/46 |
| 4,144,470 | 3/1979 | Auinger | 310/198 |
| 4,163,915 | 8/1979 | Fong | 310/198 |
| 4,280,072 | 5/1978 | Gotou et al. | 310/67 R |
| 4,284,919 | 8/1981 | Auinger | 310/198 |
| 4,346,335 | 8/1982 | McInnis | 310/184 |
| 4,348,606 | 9/1982 | Hibino | 310/184 |
| 4,547,713 | 10/1985 | Langley | 310/68 R |

FOREIGN PATENT DOCUMENTS 0071163  5/1980  Japan ................................... 310/156

Primary Examiner—R. S. Skudy
Attorney, Agent, or Firm—Wenderoth, Lind & Ponack

[57] ABSTRACT

A rotating electric motor has a permanent magnet member of a circular form and an armature core made of a magnetic material. The permanent magnet member has a plurality of N and S poles positioned alternately around the rotary shaft of the motor, and the number of the poles is P which is an even number. The armature core has a plurality of teeth formed between two adjacent winding slots of the armature core, and the number of the teeth is T which is an integer not less than 2P. Overlapping winding coils of polyphase winding groups are wound in the winding slots of the armature core, and the number of the phases of the polyphase winding groups is H which is an integer not less than 2. The armature core has at least a pair of short-blocks and long-blocks, each of which is a group of teeth having at least one tooth and positioned sequentially. Each short-block has at least one short-tooth and no long-tooth, and each long-block has at least one long-tooth and no short-tooth, where the effective pitch of each short-tooth is smaller than $D=(360/T)$ degrees and the effective pitch of each long-tooth is larger than D. Because of this arrangement, the phases of the winding slots of the armature core with the period of 1 pole pitch of the permanent magnet member are different from each other, and the cogging torque of the rotating electric motor is small. Preferably, dummy-slot portions are provided at least on the faces of the long-teeth of the armature core.

30 Claims, 21 Drawing Figures

WINDING GROUP A (A1, A2, A3, A4)
WINDING GROUP B (B1, B2, B3, B4)
WINDING GROUP C (C1, C2, C3, C4)

WINDING GROUP A (A1,A2,A3,A4)
WINDING GROUP B (B1,B2,B3,B4)
WINDING GROUP C (C1,C2,C3,C4)

ROTATING ELECTRIC MOTOR WITH REDUCED COGGING TORQUE

BACKGROUND OF THE INVENTION

1. Field of the Invention

This invention relates to a rotating electric motor, and more particularly to a rotating electric motor comprising an armature core made of a magnetic material having a plurality of teeth and a plurality of overlapping winding coils of polyphase winding groups, and a field permanent magnet member which is arranged so as to have a plurality of alternating N and S poles opposed to said teeth of the armature core, the number of the N and S poles being P which is an even number, and the number of the teeth being T which is an integral multiple of P and not less than 2P.

2. Description of the Prior Art

A rotating electric motor comprising an armature core of a magnetic material having a plurality of teeth and a field permanent magnet member having magnetized poles opposed to the teeth is widely used since it has a high efficiency. But, the conventional rotating electric motor as a problem in that a harmful vibration occurs due to an intense cogging torque generated by the interaction between the magnetized poles of the permanent magnet and the teeth of the armature core. This cogging torque prevents a smooth rotation of the rotating electric motor. In order to reduce the cogging torque, a skewed armature core is used in some cases. But, it is difficult to make the skewed armature core, and the cogging torque is sometimes not reduced enough by the skewed armature core. The use of an armature core having no tooth for getting a smooth rotation is impractical because of its low efficiency which necessitates a large size of motor.

A construction of a rotating electric motor with a reduced cogging torque is disclosed in U.S. Pat. No. 4,280,072 or Japanese Laid-open Patent Applicaiton No. 55-71163. In these patent specifications, indented portions are used to reduce the cogging torque. This method is very effective in the case where the number of teeth T is smaller than double the number P of the N and S poles, that is T<2P, such as the rotating electric motors shown in FIG. 1, FIG. 5 and FIG. 6 of U.S. Pat. No. 4,280,072, since the face of each of the teeth is wide enough to provide a number of indented portions. But, the cogging torque of a rotating electric motor such as shown in FIG. 8 in U.S. Pat. No. 4,280,072, in which T is not less than 2P, is not sufficiently reduced by the above method (the same rotating electric motor is disclosed in Japanese Laid-open Patent Application No. 55-71163).

The conventional rotating electric motors are described hereinbelow.

FIG. 1 is a schematic sectional view of a conventional rotating electric motor with the relationship T=6P. In FIG. 1, a cylindrical permanent magnet 3 is fixed to the outer circumference of a rotor 2 made of a magnetic material, and the permanent magnet 3 rotates with the rotor 2 around a rotary shaft 1. The permanent magnet 3 has 4 poles of alternating N and S poles positioned at intervals of an equal angle of 90 degrees, that is, P=4. The teeth 6 of an armature core 4, each of which is formed between two adjacent winding slots 5, are faced to the poles of the permanent magnet 3. The rotary shaft 1 of the rotor 2 is rotatably supported by the armature core 4. Therefore, the relative position between the teeth 6 of the armature core 4 and the poles of the permanent magnet 3 changes according to the rotation of the rotor 2.

FIG. 2 shows a development view of the conventional motor of FIG. 1 developed at the lines X-X' and Y-Y', when these lines are in a line. The armature core 4 has 24 winding slots a to x at intervals of an equal angle of 15 degree, and 24 teeth are provided between two adjacent winding slots, that is, T=24. Overlapping winding coils A1, A2, A3, A4, B1, B2, B3, B4, C1, C2, C3 and C4 are wound in the winding slots a to x. Each of the winding coils A1 to C4 encircles 5 teeth of the armature core 4. That is, A1 is wound in the winding slots a and f, A2 is wound in the winding slots g and l, A3 is wound in the winding slots m and r, A4 is wound in the winding slots s and x, B1 is wound in the winding slots e and j, B2 is wound in the winding slots k and p, B3 is wound in the winding slots q and v, B4 is wound in the winding slots w and d, C1 is wound in the winding slots i and n, C2 is wound in the winding slots o and t, C3 is wound in the winding slots u and b, and C4 is wound in the winding slots c and h. The winding coils A1,A2,A3 and A4 are connected in series to form a winding group A of the first phase, the winding coils B1,B2,B3 and B4 are connected in series to form a winding group B of the second phase, and the winding coils C1,C2,C3 and C4 are connected in series to form a winding group C of the third phase. The phase difference among the winding groups A,B and C is equal to 120el (electrical degrees), where 180el is equivalent to 1 pole pitch of (360/P) degrees of the permanent magnet 3. In FIG. 1, since P=4, then 180el is equivalent to 90 degrees (mechanical degrees). Therefore, a torque accelerating the rotor 2 is obtained by supplying three phase currents to the three phase winding groups A, B and C. FIG. 3 is a schematic sectional view of another conventional rotating electric motor with the relationship T=3P. The structure of the conventional motor shown in FIG. 3 is the same as that of the conventional motor shown in FIG. 1, except for the relationship between T and P, and the winding pitch. A cylindrical permanent magnet 13 is fixed to the outer circumference of a rotor 12 made of a magnetic material, and the permanent magnet 13 rotates with the rotor 12 around a rotary shaft 11. The permanent magnet 13 has 4 poles of alternating N and S poles positioned by an equal angle of 90 degrees, that is, P=4. The teeth 16 of an armature core 14, each of which is formed between two adjacent winding slots 15, are faced to the poles of the permanent magnet 13. The rotary shaft 11 of the rotor 12 is rotatably supported by the armature core 14. Therefore, the relative position between the teeth 16 of the armature core 14 and the poles of the permanent magnet 13 changes according to the rotation of the rotor 12.

FIG. 4 shows a development view of the conventional motor of FIG. 3 developed at the lines X-X' and Y-Y', when these lines are in a line. The armature core 14 has 12 winding slots a to l at intervals of an equal angle of 30 degrees, and 12 teeth are provided between two adjacent winding slots, that is, T=12. Overlapping winding coils A1, A2, A3, A4, B1, B2, B3, B4, C1, C2, C3 and C4 are wound in the winding slots a to l. Each of the winding coils A1 to C4 encircles 3 of the teeth of the armature core 14. That is, A1 is wound in the winding slots a and d, A2 is wound in the winding slots d and g, A3 is wound in the winding slots g and j, A4 is wound in the winding slots j and a, B1 is wound in the winding slots c and f, B2 is wound in the winding slots f and i, B3 is wound in the winding slots i and l, B4 is wound in the winding slots l and c, C1 is wound in the winding slots e and h, C2 is wound in the winding slots h and k, C3 is wound in the winding slots k and b, and C4 is wound in the winding slots b and e. The winding coils A1,A2,A3 and A4 are connected in series to form a winding group A of the first phase, the winding coils B1,B2,B3 and B4 are connected in series to form a winding group B of the second phase, and the winding coils C1,C2,C3 and C4 are connected in series to form a winding group C of the third phase. The phase difference among the winding groups, A,B and C is equal to 120el. In FIG. 3, since P=4, then 180el is equivalent to 90 degrees (mechnical degrees). Therefore, a torque accelerating the rotor 2 is obtained by supplying three phase currents to the three phase winding groups A, B and C.

SAMMARY OF THE INVENTION

An object of the present invention is to provide a new and improved rotating electric motor of high efficiency with reduced cogging torque.

Another object of the present invention is to provide a rotating electric motor comprising an armature core of a magnetic material having T teeth and a field permanent magnet member having a P permanently magnetized N and s poles, where T is not less than 2P, and having reduced cogging torque which is related to the geometry of the armature core and the magnet.

These objects of the present invention are achieved by providing a rotating electric motor according to the invention, which comprises: a field permanent magnet member of a circular form having permanently magnetized N and S poles alternately positioned around a rotary shaft of said electric motor, the number of said N and S poles being P which is an even number; and an armature core made of a magnetic material having a plurality of teeth disposed between two adjacent winding slots where a plurality of overlapping winding coils of polyphase winding groups are wound, the number of said teeth being T which is not less than 2P, and the number of the phases of said polyphase winding groups being H which is not less than 2; wherein said armature core has at least a pair of short-blocks and long-blocks alternately positioned around said rotary shaft. Each short-block has at least two short-teeth and no long-tooth, and each long-block has at least one long-tooth and no short-tooth. The effective pitch of each short-tooth is smaller than D=(360/T) degrees, and the effective pitch of each long-tooth is larger than D.

The above objects of the invention are also achieved by providing a rotating electric motor according to the present invention, which comprises: a field permanent magnet member of a circular form having permanently magnetized N and S poles alternately positioned around a rotary shaft of said electric motor, the number of said N and S poles being P which is an even number; and an armature core made of a magnetic material having a plurality of teeth made between two adjacent winding slots where a plurality of overlapping winding coils of polyphase winding groups are wound, the number of said teeth being T which is not less than 2P, and the number of the phases of said polyphase winding groups being H which is not less than 2; wherein said armature core has at least a pair of short-blocks and long-blocks alternately positioned around said rotary shaft. Each short-block has at least one short-tooth and no long-tooth, and each long-block has at least two long-teeth and no short-tooth. The effective pitch of each short-tooth is smaller than D=(360/T) degrees, and the effective pitch of each long-tooth is larger than D.

The above objects of the invention are also achieved by providing a rotating electric motor according to the present invention, which comprises: a field permanent magnet member of a circular form having permanently magnetized N and S poles alternately positioned around a rotary shaft of said electric motor, the number of said N and S poles being P which is an even number; and an armature core made of a magnetic material having a plurality of teeth disposed between two adjacent winding slots where a plurality of overlapping winding coils of polyphase winding groups are wound, the number of said teeth being T which is not less than 2P, and the number of the phases of said polyphase winding groups being H which is not less than 2; weherein said armature core has at least one short-tooth and at least one long-tooth. The effective pitch of each short-tooth is smaller than D=(360/T) degrees, and the effective pitch of each long-tooth is larger than D. The whole effective pitch of sequential L teeth of said armature core is equal or almost equal to (360/P)Q degrees, where L is an integer larger than H and Q is an integer not less than 2. The ratio of the smallest value of the effective pitches of the teeth to the effective pitch of the m-th tooth in said sequential L teeth is R:R+Vm, where R is an integer not less than 1 and Vm is an integer including 0, and the sum of Vm from m=1 to m=L is W which is not equal to an integral multiple of Qd, where Qd is a divisor of Q and larger than 1.

The above objects of the invention are also achieved by providing a rotating electric motor according to the present invention, which comprises a field permanent magnet member of a circular form having permanently magnetized N and S poles alternately positioned around a rotary shaft of said electric motor, the number of said N and S poles being an even number; and an armature core made of a magnetic material having a plurality of teeth disposed between two adjacent winding slots where a plurality of overlapping winding coils of the polyphase winding groups are wound, the number of said teeth being T which is not less than 2P, and the number of the phases of said polyphase winding groups being H which is not less than 2; wherein at least one of said teeth has at least one dummy-slot portion, and said armature core has at least first and second slot-groups. The dummy-slot portions and the winding slots in said first slot-group are positioned at equal or almost equal angles by a first pitch, and the dummy-slot portions and the winding slots in said second slot-group are positioned at an equal or almost equal angles by the first pitch. A second pitch between adjacent winding slots of said first slot-group and said second slot-group is not equal to an integral multiple of said first pitch.

The above and other objects and features of the invention will be apparent from consideration of the following detailed description taken in connection with the accompanying drawings, in which:

DESCRIPTION OF THE PREFERRED EMBODIMENTS

Embodiment of the Invention with the relationship T=6P

Figure 1:
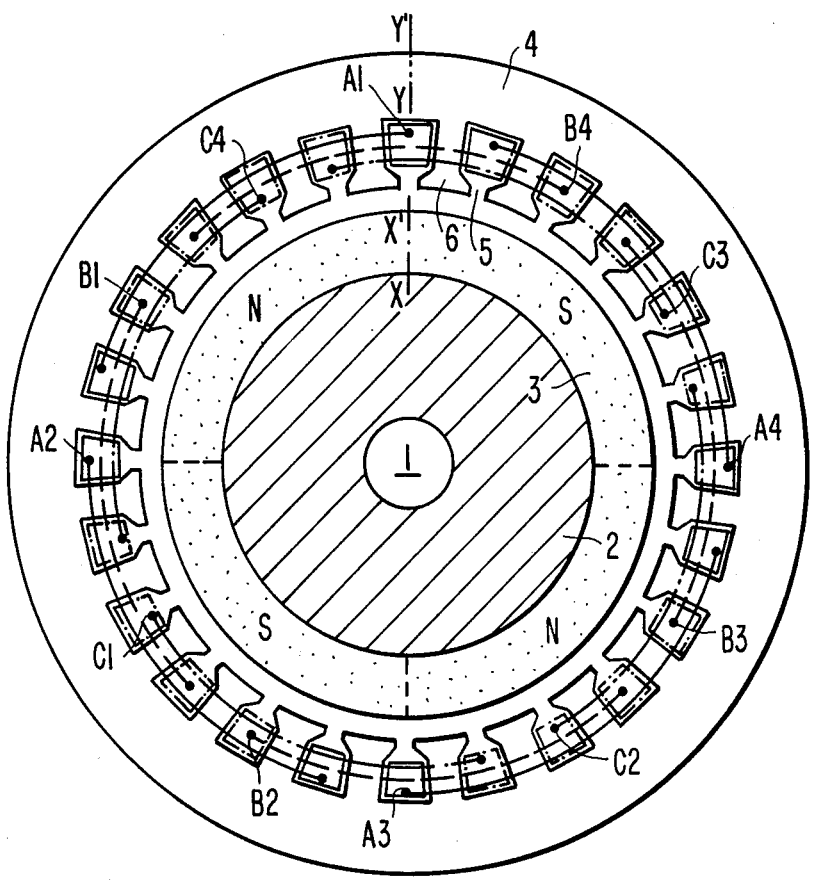
FIG. 1 is a schematic sectional view of a conventional rotating electric motor with T=6P.
Figure 2:
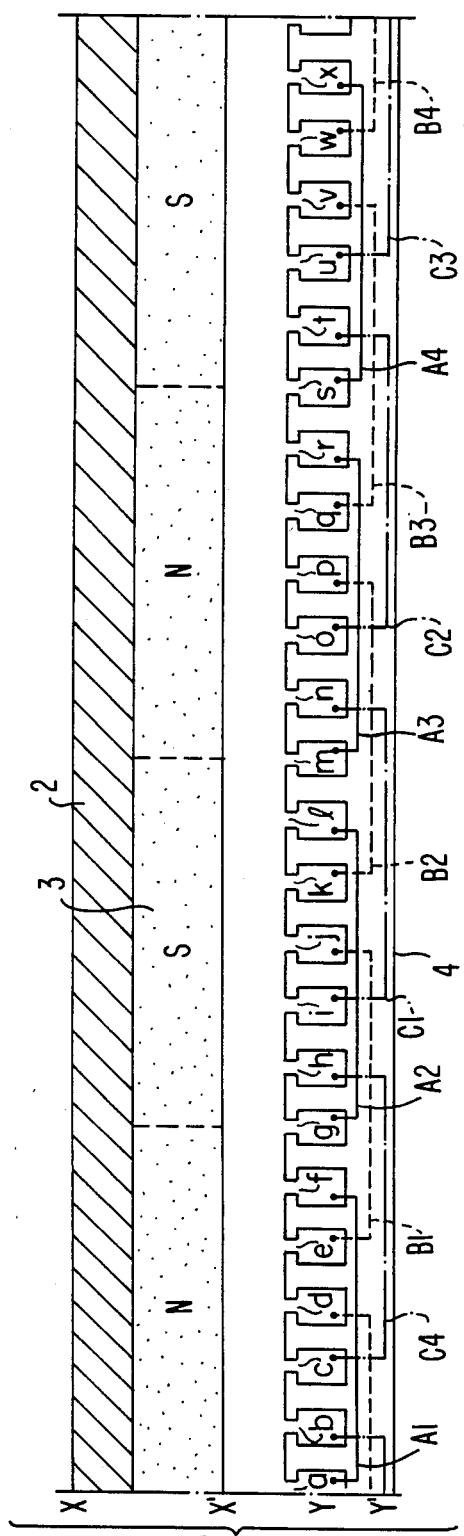
FIG. 2 is a development view of the conventional rotating electric motor of FIG. 1 developed at the lines X-X' and Y-Y'.
Figure 5:
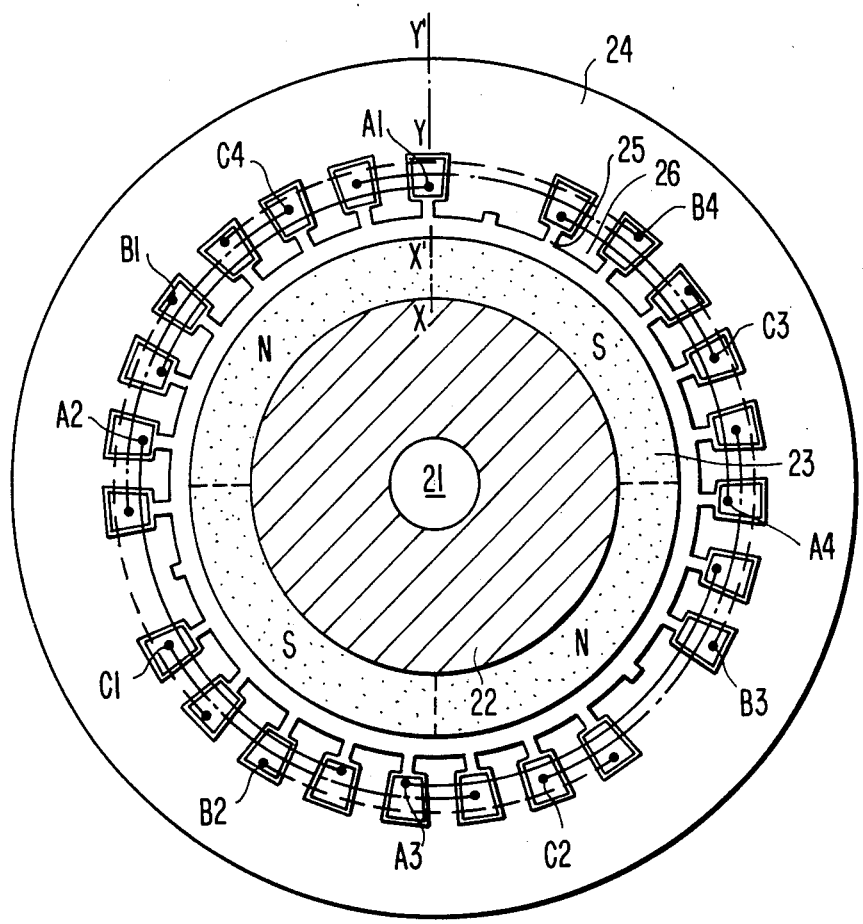
FIG. 5 is a schematic sectional view of an embodiment of the rotating electric motor of the invention with the relationship T=6P.
Figure 6:
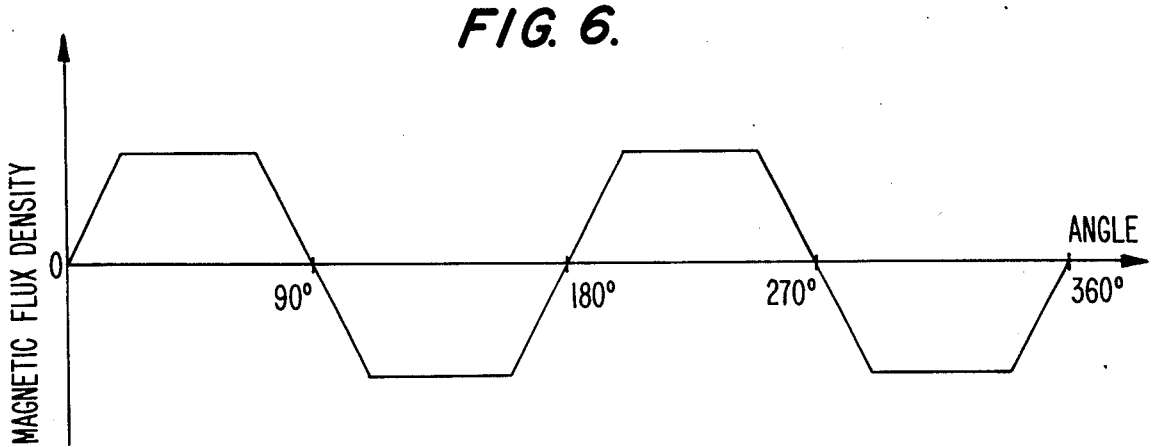
FIG. 6 is a diagram showing a distribution of the magnetic flux density of the permanent magnet shown in FIG. 5.

FIG. 5 shows a schematic sectional view of an embodiment of a brushless DC motor of the invention with the relationship T=6P, where T is the number of teeth of the armature core and P is the number of poles of the field permanent magnet, which corresponds to the conventional rotating electric motor shown in FIG. 1 and FIG. 2. In FIG. 5, a cylindrical permanent magnet 23 is fixed to the outer circumference of a rotor 22 made of a magnetic material, and the permanent magnet 23 rotates with the rotor 22 around a rotary shaft 21. The permanent magnet 23 has 4 poles of alternating N and S poles positioned at intervals of an equal angle of 90 degrees, that is, P=4, where P is the number of the poles of the permanent magnet 23. FIG. 6 shows a distribution of the magnetic flux density of the permanent magnet 23. The teeth 26 of an armature core 24, each of which is formed between two adjacent winding slots 25, are faced to the poles of the permanent magnet 23. The rotary shaft 21 of the rotor 22 is rotatably supported by the armature core 24. Therefore, the relative position between the teeth 26 of the armature core 24 and the poles of the permanent magnet 23 changes accoding to the rotation of the rotor 22.

Figure 7:
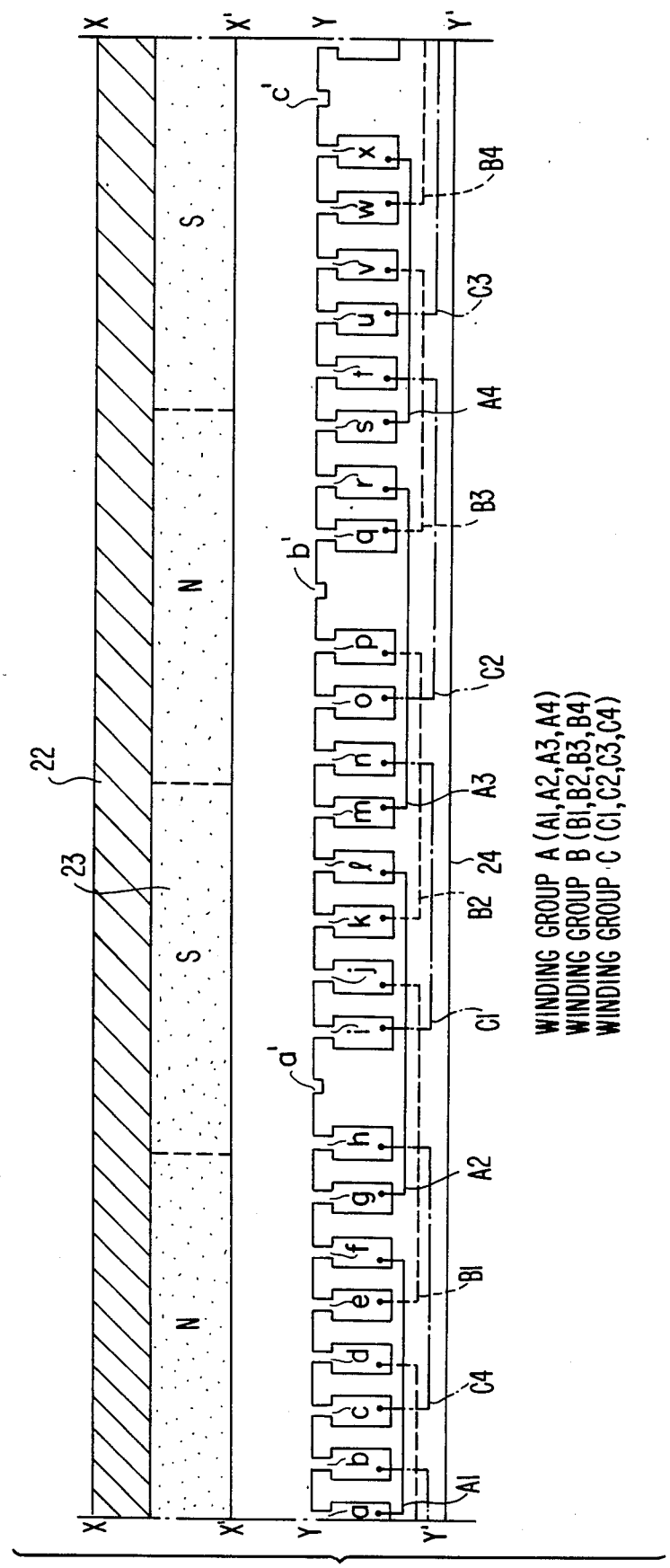
FIG. 7 is a development view of the rotating electric motor of FIG. 5 developed at the lines X-X' and Y-Y'.

FIG. 7 shows a development view of the brushless DC motor of FIG. 5 developed at the lines X-X' and Y-Y', when these lines are in a line. The armature core 24 has 24 winding slots a, b, c, d, e, f, g, h, i, j, k, l, m, n, o, p, q, r, s, t, u, v, w and x, and 24 teeth are provided between two adjacent winding slots, that is, T=24, where T is the number of the teeth of the armature core 24. The armature core 24 also has 3 dummy-slot portions a',b' and c' at the faces of some of the teeth opposed to the permanent magnet 23, and no coils are wound in the dummy-slot portions. Overlapping winding coils A1, A2, A3, A4, B1, B2, B3, B4, C1, C2, C3 and C4 are wound in the winding slots a to x. Each of the winding coils A1 to C4 encircles 5 teeth of the armature core 24. That is, A1 is wound in the winding slots a and f, A2 is wound in the winding slots g and l, A3 is wound in the winding slots m and 4, A4 is wound in the winding slots s and x, B1 is wound in the winding slots e and j, B2 is wound in the winding slots k and p, B3 is wound in the winding slots q and v, B4 is wound in the winding slots w and d, C1 is wound in the winding slots i and n, C2 is wound in the winding slots o and t, C3 is wound in the winding slots u and b, and C4 is wound in the winding slots c and h. The winding coils A1,A2,A3 and A4 are connected in series to form a winding group A of the first phase, the winding coils B1,B2,B3 and B4 are connected in series to form a winding group B of the second phase, and the winding coils C1,C2,C3 and C4 are connected in series to form a winding group C of the third phase. As will be described later, the phase differences among the winding groups A,B and C are exactly equal to 120el (electrical degrees), where 180el is equivlent to 1 pole pitch of (360/P) degrees. In FIG. 5, P=4, then 180el is equivalent to 90 degrees (mechnical degrees), which is the same as that of the conventional motor of FIG. 1. Therefore, a torque accelerating the rotor 22 is obtained by supplying three phase currents to the three phase winding groups A, B and C.

Figure 8:
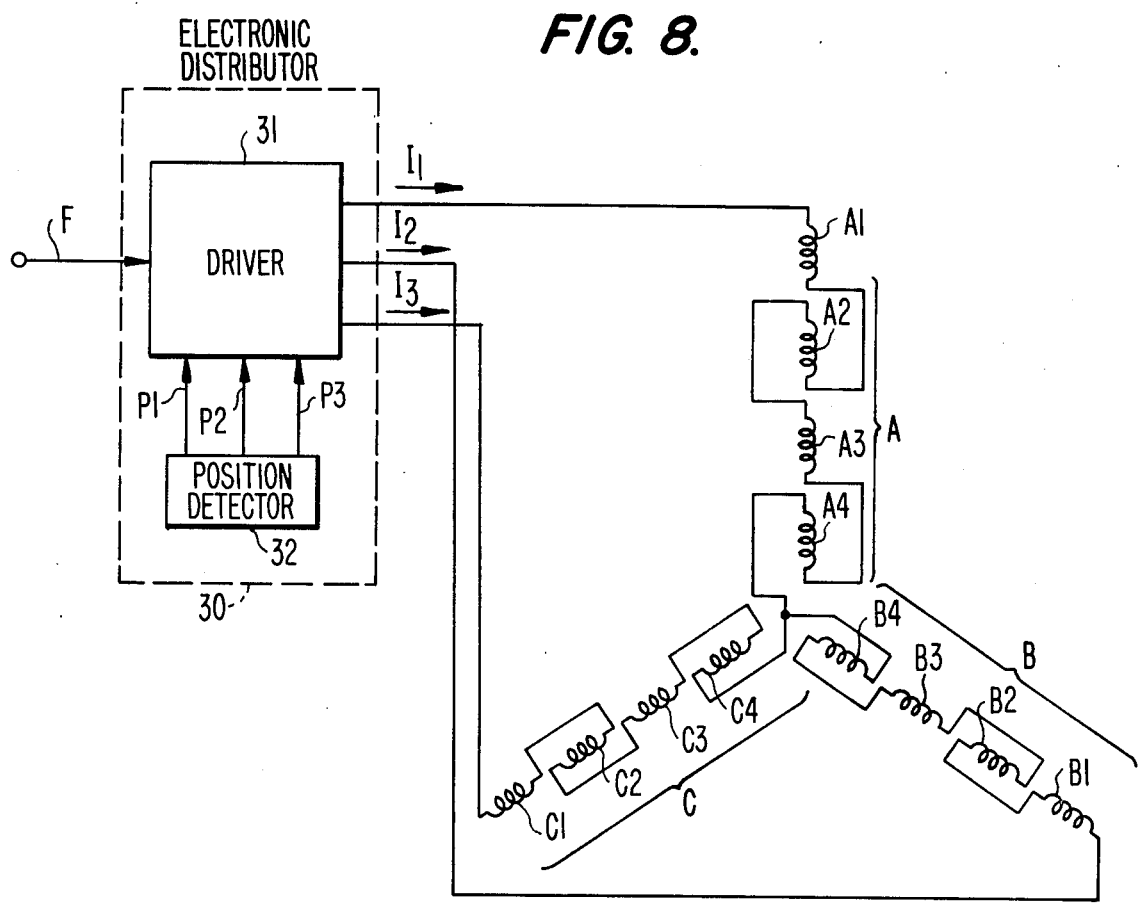
FIG. 8 is a block diagram of an electronic distributor for the rotating electric motor shown in FIG. 5.
Figure 9:
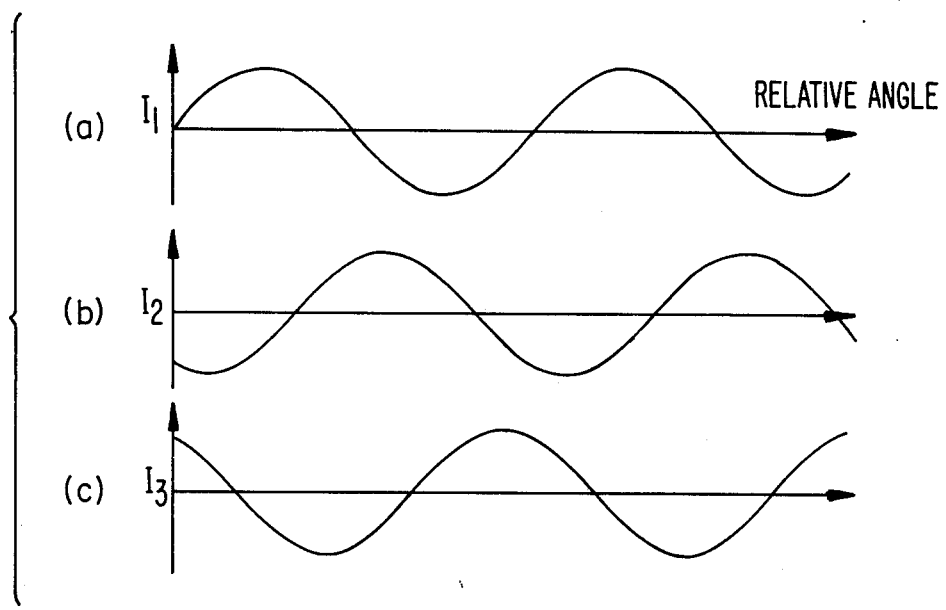
FIGS. 9(a)-(c) are waveform diagrams of three phase currents I1, I2 and I3 supplied to three phase winding groups of the rotating electric motor shown in FIG. 5.

FIG. 8 shows an electronic distributor 30 for the brushless DC motor of the invention. The electronic distributor 30 has a driver 31 and a position detector 32, and supplies the starconnected three phase winding groups A,B and C with three phase cureents I1,I2 and I3, respectively. The position detector 32 detects the relative position between the armature core 24 and the permanent magnet 23, and it outputs three phase sinusoidal signals P1,P2 and P3 which change with the rotation of the rotor 22 by detecting the magnetic flux of the permanent magnet 23. The driver 31 outputs the three phase currents I1,I2 and I3, which are proportional to a command signal F multiplied by the output signals P1,P2 and P3, respectively. Thus, a torque for accelerating the rotor 22 is generated by the interaction between the magnetic flux of the permanent magnet 23 and the three phase currents I1,I2 and I3 of the winding groups A,B and C. The electro-magnetic torque by the three phase currents will be described later in detail.

In FIG. 7, since the winding slots a to x are positioned at intervals of unequal angles, the effective pitches of the teeth are not the same, where the "effective pitch" of a tooth is defined as the angle between the centers of entrance parts of the adjacent winding slots forming the tooth. In the case of the relationship $T=6P=24$ ($P=4$), the standard effective pitch is $D=(360/T)=15$ degrees when all of the winding slots are positioned at intervals of an equal angle. So, a tooth having the effective pitch smaller than D is called a "short-tooth", and a tooth having the effective pitch larger than D is called a "long-tooth" in the specification. A a tooth is designated by the adjacent winding slots forming the tooth. For example, the tooth a-b means the tooth formed by the winding slots a and b. In FIG. 7, the teeth a-b, b-c, c-d, d-e, e-f, f-g, g-h, i-j, j-k, k-l, l-m, m-n, n-o, o-p, q-r, r-s, s-t, t-u, u-v, v-w and w-x are short-teeth, and the teeth h-i, p-q and x-a are long-teeth.

A block having at least one short-tooth and no long-tooth positioned sequentially is called a "short-block", and a block having at least one long-tooth and no short-tooth positioned sequentially is called a "long-block" in the specification. And a block is designated by the winding slots positioned at either sides of the block. For example, the block <a,h> means the block of the teeth a-b,b-c,c-d,d-e,e-f,f-g and g-h. In FIG. 7, there are three short-blocks <a,h>, <i,p> and <q,x>, which are the short-blocks of the teeth a-b,b-c,c-d,d-e,e-f,f-g and g-h, the short-blocks of the teeth i-j,j-k,k-l,l-m,m-n,n-o and o-p, and the short-blocks of the teeth q-r,r-s,s-t,t-u,u-v,v-w, respectively. There are three long-blocks <h,i>, <p,q> and <x,a>, which are the long-block of the tooth h-i, the long-block of the tooth p-q, and the long-block of the tooth x-a, respectively. Notice that the number of teeth is not used to classify the block but the nature of the teeth including.

Each of the short-blocks <a,h>, <i,p> and <q,x> and <q,x> has 7 short-teeth, and each of the long-blocks <h,i>, <p,q> and <x,a> has only one long-tooth. The armature core 24 of the brushless DC motor of the invention shown in FIG. 5 and FIG. 7 has 3 pairs of short-blocks and long-blocks positioned alternately around the rotary shaft 21, and these 3 pairs of short-blocks and long-blocks are symmetrical with respect to the rotary shaft 21.

Each of the effective pitches of the short-teeth a-b, b-c, c-d, d-e, e-f, f-g, g-h, i-j, j-k, k-l, l-m, m-n, n-o, o-p, q-r, r-s, s-t, t-u, u-v, v-w and w-x is equal or nearly equal to $(360/27)=13.333$ degrees, and each of the effective pitches of the long-teeth h-i,p-q and x-a is equal or nearly equal to $(720/27)=26.667$ degrees. Thus, the ratio of the effective pitch of each of the short-teeth to the effective pitch of each of the long-teeth is 1:2. The long-tooth h-i has a dummy-slot portion a' at its center portion faced to the poles of the permanent magnet 23, the long-tooth p-q has a dummy-slot portion b' at its center portion, and the long-tooth x-a has a dummy-slot portion c' at its center portion. Therefore, the winding slots a to x and the dummy-slot portions a' to c' are positioned at intervals of an equal or nearly equal angle of $(360/27)=13.333$ degrees.

Next, the cogging torque of the embodiment of the invention shown in FIG. 5 will be explained hereinbelow. Cogging torque is generated by the interaction between the permanent magnet and the armature core, more particularly by changing the magnetic energy stored in the air gap according to the relative rotation between the permanent magnet and the armature core, and it changes periodically according to the relative position thereof with a basic period of 360 degrees (one revolution). This is harmful for getting a smooth rotation of the rotating electric motor. The cogging torque is influenced by the shape of the armature core facing the permanent magnet and by the distribution of the magnetic charge in the poles of the permanent magnet. The shape of the armature core is represented by shape harmonics expanded by the Fourier series with the basic period of 360 degrees and the shape harmonics relate to the shape of the armature core. The distribution of the magnetic charge is represented by the magnetic distribution harmonics also expanded by the Fourier series with the basic period of 360 degrees, and the magnetic distribution harmonics relate to the distribution of the magnetic charge in the permanent magnet.

In the case of using the permanent magnet which provides the armature core with a fixed field flux distribution, the cogging torque is determined by the convolution between the shape harmonics and the magnetic distribution harmonics, and is also expanded by the Fourier series with the basic period of 360 degrees. The magnitude of each component (cycle/revolution) of the cogging torque is proportional to the product of the component of the shape harmonics and the component of the magnetic distribution harmonics of the same degree number as that of the cogging torque.

Since the magnetic energy in the air gap is proportional to the square of the magnetic flux density of the permanent magnet and the distribution of the magnetic flux density shown in FIG. 6 is symmetrical with regard to the polarities, the magnetic distribution harmonics of the permanent magnet 23 is a periodic function with the period of 1 pole pitch $(360/P)=90$ degrees. Thus, the cogging torque becomes small when the composite magnetic variation of the shape harmonics of the armature core 24 with the period of 1 pole pitch becomes small.

Figure 10:
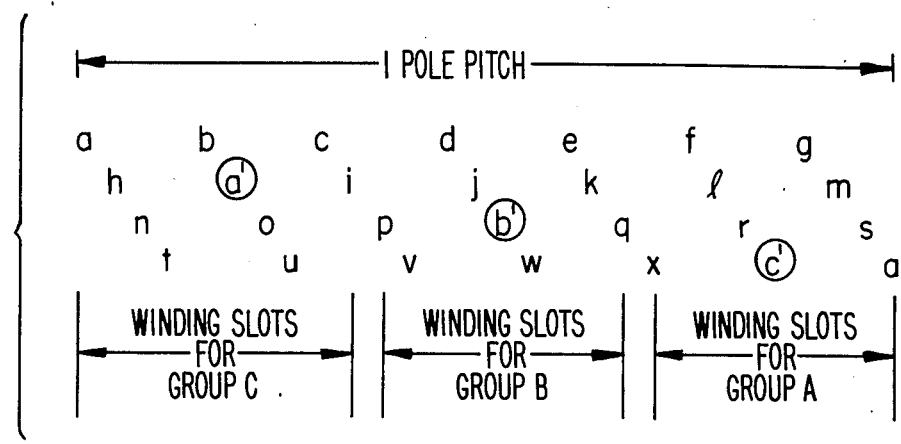
FIG. 10 is a phase diagram of the winding slots and the dummy-slot portions of the armature core with the period of the 1 pole pitch of the permanent magnet about the rotating electric motor of the invention shown in FIG. 5 and FIG. 7.

FIG. 10 shows phases of the winding slots a to x and the dummy-slot portions a' to c' of the armature core 24 with the period of 1 pole pitch of the permanent magnet 23. The winding slots a,f,g,l,m,r,s and x, where the winding coils A1,A2,A3 and A4 of the winding group A are wound, and the dummy-slot portion c' are positioned at intervals of a phase difference of (1 pole pitch)/27. That is, the phases of the winding slots a,f,g,l,m,r,s and x and the dummy-slot portion c' differ from each other by (1 pole pitch)/27, and the range of the phases of the winding slots a,f,g,l,m,r,s and x is within (1 pole pitch)/3. Simlarly, the winding slots d,e,j,k,p,q,v and w, where the winding coils B1,B2,B3 and B4 of the winding group B are wound, and the dummy-slot portion b' are positioned at intervals of the same phase difference of (1 pole pitch)/27, and the range of the phases of the winding slots d,e,j,k,p,q,v and w is within (1 pole pitch)/3. Similarly, the winding slots b,c,h,i,n,o,t and u, where the winding coils C1,C2,C3 and C4 of the winding group C are wound, and the dummy-slot portion a' are positioned at intervals of the same phase difference of (1 pole pitch)/27, and the range of the phases of the winding slots b,c,h,i,n,o,t and u is within (1 pole pitch)/3. Further, the phase differences among the winding slot group (a,f,g,l,m,r,s,x) for the winding group A, the winding slot group (d,e,j,k,p,q,v,w) for the winding group B and the winding slot group (b,c,h,i,n,o,t,u) for the winding group C are exactly equal to (1 pole pitch)/3. As the result of this, the phase differences among the three phase winding groups A, B and C are exactly equal to 120el degrees.

All of the phases of the winding slots a to x and the dummy-slot portions a' to c' are different by the phase difference of (1 pole pitch)/27, and it is expected that the composite magnetic variation with the period of 1 pole pitch becomes small.

Figure 11:
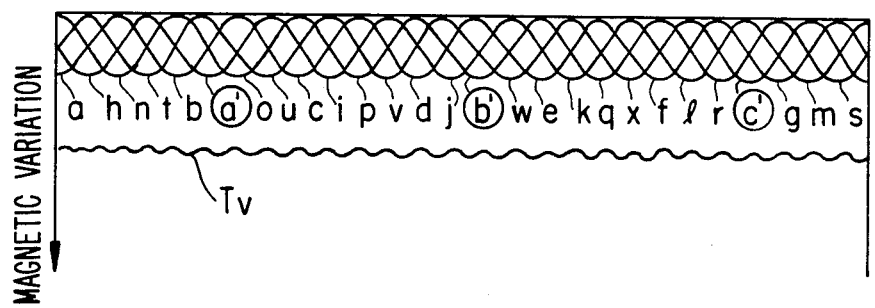
FIG. 11 is a diagram showing a composite magnetic variation of the rotating electric motor of the invention shown in FIG. 5 and FIG. 7.

FIG. 11 shows waveforms of the magnetic variations of the winding slots a to x and the dummy-slot portions a' to c' and a waveform of the composite magnetic variation Tv of the armature core 24. Each of the winding slots and the dummy-slot portions produces a magnetic variation at and about the respective phases with the period of 1 pole pitch shown in FIG. 10. Thus, the magnetic variations of the dummy-slot portions a', b' and c' are located between those of the winding slots b and o, between those of j and w and between those of r and g, respectively. The magnetic variation of each of the winding slots and dummy-slot portions changes smoothly corresponding to the each entance width, and each of the dummy-slot portions a',b' and c' has same magnetic effect as that of each of the winding slots a to x. Since the phases of the winding slots and the dummy-slot portions differ from each other by (1 pole pitch)/27, the composite magnetic variation Tv becomes considerably small.

Figure 12:
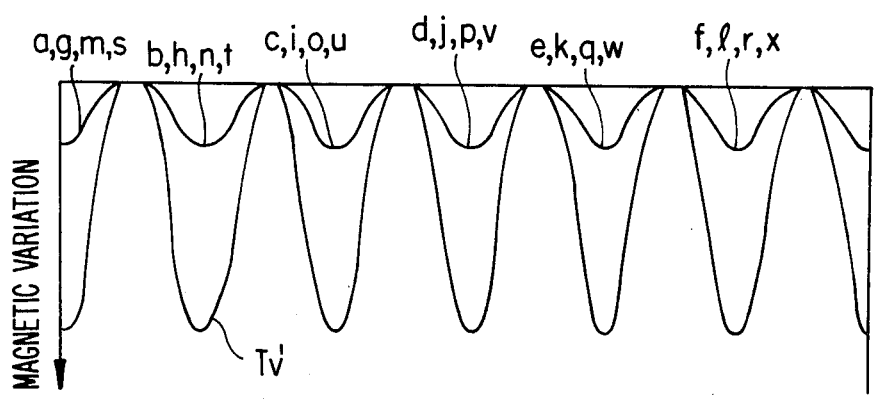
FIG. 12 is a diagram showing a composite magnetic variation of the conventional rotating electric motor shown in FIG. 1 and FIG. 2.

FIG. 12 shows a waveform of the composite magnetic variation Tv' of the armature core 4 of the conventional rotating electric motor shown in FIG. 1 and FIG. 2. In the case of the conventional rotating electric motor, the phases of the winding slots a,g,m and s are same with the period of 1 pole pitch, the phases of the winding slots b,h,n and t are same, the phases of the winding slots c,i,o and u are same, the phases of the winding slots d,j,p and v are same, the phases of the winding slots e,k,q and w are same, and the phases of the winding slots f,l,r and x are same. So, the composite magnetic variation Tv' is large. Comparing the composite magnetic variation Tv of FIG. 11 with the composite magnetic variation Tv' of FIG. 12, the Tv of the motor of the invention is much smaller than the Tv' of the conventional motor. Therefore, the embodiment of the brushless DC motor of the invention shown in FIG. 5 has a lower cogging torque. Notice that the cogging torque of the brushless DC motor of FIG. 5 without the dummy-slot portions is also small, because the composite magnetic variation of the armature core 24 without the dummy-slot portions is smaller than the composite magnetic variation Tv' of the conventional armature core 4 shown in FIG. 12.

Next, the electro-magnetic torque of the brushless DC motor of the invention shown in FIG. 5 will be explained hereinbelow. The electro-magnetic torque is the sum of the torques generated by the three phase currents I1,I2 and I3 supplied to the three phase winding groups A,B and C, and each of the torques generated by the three phase winding groups A,B and C due to each of the currents I1,I2 and I3 is the product of the current and the flux density. Thus, the electro-magnetic torque Tor is $$\text{Tor} = G(Ba I1 + Bb I2 + Bc I3) \quad (1),$$

where G is a constant value, and Ba, Bb and Bc are the equivalent flux densities of the three phase winding groups, A, B and C, respectively. It is assumed here that the distribution of the permanent magnet 23 is sinusoidal, that is $$B(x) = B1s \text{ in } (x) \quad (2),$$

where x is an angle (electrical degrees). Then, the equivalent flux densities Ba, Bb and Bc also become sinusoidal, that is $$Ba(z) = KB1s \text{ in } (z) \quad (3a)$$

$$Bb(z) = KB1s \text{ in } (z - 120el) \quad (3b)$$

$$Bc(z) = KB1s \text{ in } (z - 240el) \quad (3c),$$

where K is a constant value and z is the relative angle (electrical degrees) between a reference point of the armature core 24 and a reference point of the permanent magnet 23. Since the three phase currents I1, I2 and I3 are sinusoidal, $$I1(z) = Ips \text{ in } (z) \quad (4a)$$

$$I2(z) = Ips \text{ in } (z - 120el) \quad (4b)$$

$$I3(z) = Ips \text{ in } (z - 240el) \quad (4c),$$

where Ip is the peak value of the currents proportional to the command signal F. Then, the generated torque becomes $$\text{Tor} = (3/2)(GK)B1Ip \quad (5)$$

The electro-magnetic torque Tor of the embodiment is smooth and has no ripple torque.

But the actual distribution of the permanent magnet 23 of FIG. 6 has higher components of 3rd, 5th, 7th, and so on. These higher components, especially the 3rd, 5th and 7th components, produce a ripple torque, and this ripple torque prevents the smooth rotation of the motor as well as the cogging torque. Since the phases of the winding slots for each winding group A,B or C are different within (1 pole pitch)/3, the equivalent effective flux densities Ba, Bb and Bc have reduced components of 3rd, 5th, and 7th components, and so on. Assuming that the distribution of the flux density of the permanent magnet 23 is as follows:

$$B(x) = B1s \text{ in } (x) + B3s \text{ in } (3x) + B5s \text{ in } (5x) + B7s \text{ in } (7x) \quad (6)$$

Then, the equivalent flux densities Ba, Bb and Bc become as follows:

$$Ba(z) = K\{K1B1s \text{ in } (z) + K3B3s \text{ in } (3z) + K5B5s \text{ in } (5z) + K7B7s \text{ in } (7z)\} \quad (7a)$$

$$Bb(z) = Ba(z - 120el) \quad (7b)$$

$$Bc(z) = Ba(z - 240el) \quad (7c),$$

where $K1 = 0.95$, $K3 = 0.595$, $K5 = 0.093$ and $K7 = -0.283$. Thus, $K1/K1 = 1$ (normalized), $K3/K1 = 0.62$, $K5/K1 = 0.098$ and $K7/K1 = -0.30$. Since the absolute values of the coefficients $K3/K1, K5/K1$ and $K7/K1$ are much smaller than 1, the influences of the higher components B3, B5, B7 of the permanent magnet 23 are reduced and the ripple torque of the brushless DC motor of the above embodiment becomes small. Therefore, the cogging torque and the ripple torque of the brushless DC motor of the invention shown in FIG. 5 are small, and therefore smooth rotation can be obtained.

The winding coils A1, A2, A3, A4, B1, B2, B3, B4, C1, C2, C3 and C4 of the armature core 24 in the above embodiment can be automatically wound by a winding machine, because the winding pitches of these winding coils are almost equal to 5/6 of the 1 pole pitch of the permanent magnet 23, where the winding pitch of a winding coil is the angle between the centers of the winding slots in which the winding coil is wound. The winding pitches of these winding coils A1 to C4 are between 133.3el and 160el degrees. More specifically, the winding pitches of the winding coils A1, A2, A3, A4, B1, B2, B3, B4, C1, C2, C3 and C4 are 133.3el, 160el, 160el, 133.3el, 160el, 133.3el, 133.3el, 160el, 133.3el, 160el, 160el and 133.3el degrees, respectively.

In the case of the above embodiment, an electronic distributor supplying polyphase winding groups with polyphase sinusoidal currents is used, but the construction of the distributor does not relate to the cogging torque (the distributor relates to only the ripple torque). So, a mechanical brush commutator can be replaced by the electronic distributor shown in FIG. 8. Besides, although the permanent magnet 23 of FIG. 5 is formed in a continuous circular form, a magnet formed of separate parts with gaps therebetween can also be used in the invention.

As mentioned before, the cogging torque of the rotating electric motor of the invention is small even if the dummy-slot portions are deleted. Generally speaking, cogging torque can be reduced by providing a rotating electric motor which comprises a field permanent magnet member of a circular form and an armature core made of a magnetic material, said magnet member having permanently magnetized N and S poles alternately positioned around a rotary shaft of said rotary electric motor, the number of said N and S poles is P which is an even number, said armature core having a plurality of teeth arranged between two adjacent winding slots where a plurality of overlapping winding coils of polyphase winding groups are wound, the number of said teeth being T which not less than 2P, and the number of the phases of said polyphase winding groups being H which is not less than 2, wherein said armature core has at least a pair of a short-blocks and a long-blocks alternately positioned around said rotary shaft, each of said short-blocks having at least two short-teeth and no long-tooth, and each of said long-blocks having at least one long-tooth and no short-tooth, where each of the effective pitches of said short-teeth is smaller than $D=(360/T)$ degrees, and each of the effective pitches of said long-teeth is larger than D.

It is preferable that the number of the pairs of short-blocks and long-blocks is an integral multiple of H. It is also preferable that the whole effective pitch of sequential H pairs of short-blocks and long-blocks is equal or almost equal to $(360/P)Q$ degrees, and the number of said teeth at a pair of neighboring short-blocks and long-blocks in said sequential H pairs is an integral multiple of Q, where Q is an integer not less than 2 and preferably not equal to an integral multiple of H. It is also preferable that the number of said teeth in a pair of neighboring short-blocks and long-blocks is not equal to an integral multiple of H. It is also preferable that the ratio of the effective pitch of each of said short-teeth to the effective pitch of each of said long-teeth is R:R+1, where R is an integer and preferably not larger than 4. It is preferable that at least one of said long-teeth has at least one dummy-slot portion in the face thereof opposed to said magnet member. It is also preferable that the ratio of the effective pitch of each of said short-teeth to the effective pitch of each of said long-teeth is R:R+1, where R is an integer, and said dummy-slot portions and said winding slots are positioned at intervals of equal or almost equal angles around said rotary shaft.

Other constructions of the rotating electric motor of the invention having reduced cogging torque are shown in Table 1 which shows the effective pitches of teeth.

TABLE 1

| |
|---|
| (A) 2 2 2 2 2 2 2 3 2 2 2 2 2 2 2 3 2 2 2 2 2 2 2 3 |
| (B) 3 3 3 3 3 3 3 4 3 3 3 3 3 3 3 4 3 3 3 3 3 3 3 4 |
| (C) 1 1 1 1 1 1 1 4 1 1 1 1 1 1 1 4 1 1 1 1 1 1 1 4 |
| (D) 1 1 1 1 1 1 2 3 1 1 1 1 1 1 2 3 1 1 1 1 1 1 2 3 |
| (E) 3 3 3 3 3 3 3 4 5 3 3 3 3 3 3 3 4 5 3 3 3 3 3 3 3 4 5 |

In Table 1, arrangement (A) shows another arrangement of the teeth of the armature core 24 shown in FIG. 5 and FIG. 7. Each of the effective pitches of the short-teeth is changed to be equal to 2 angular units and each of the effective pitches of the long-teeth is changed to be equal to 3 angular units, where 1 angular unit is $(360/51)=7.06$ degrees. Dummy-slot portions are provided on the faces of the short-teeth and the long-teeth so that the winding slots and the dummy-slot portions are positioned at intervals of 1 angular unit.

Arrangement (B) shows still another arrangement of the teeth of the armature core 24 shown in FIG. 5 and FIG. 7. Each of the effective pitches of the short-teeth is changed to be equal to 3 angular units and each of the effective pitches of the long-teeth is changed to be equal to 4 angular units, where 1 angular unit is $(360/75)=4.8$ degrees. Dummy-slot portions are provided on the faces of the short-teeth and the long-teeth so that the winding slots and the dummy-slot portions are positioned at intervals of 1 angular unit.

Arrangement (C) shows yet another arrangement of the teeth of the armature core 24 shown in FIG. 5 and FIG. 7. Each of the effective pitches of the short-teeth is equal to 1 angular unit and each of the effective pitches of the long-teeth is changed to be equal to 4 angular units, where 1 angular unit is $(360/33)=10.909$ degrees. Dummy-slot portions are provided on the faces of the long-teeth so that the winding slots and the dummy-slot portions are positioned at intervals of 1 angular unit.

Arrangement (D) shows a further arrangement of the teeth of the armature core 24 shown in FIG. 5 and FIG. 7. Each of the short-blocks has 6 short-teeth and each of the long-blocks has 2 long-teeth. Each of the effective pitches of the short-teeth is equal to 1 angular unit and the effective pitches of the long-teeth are equal to 2 or 3 angular units, where 1 angular unit is $(360/33)=10.909$ degrees. Dummy-slot portions are provided on the faces of the long-teeth so that the winding slots and the dummy-slot portions are positioned at intervals of 1 angular unit.

Arrangement (E) shows a still further arrangement of the teeth of the armature core 24 shown in FIG. 5 and FIG. 7. Each of the short-blocks has 6 short-teeth and each of the long-blocks has 2 long-teeth. Each of the effective pitches of the short-teeth is equal to 3 angular units and the effective pitches of the long-teeth are equal to 4 or 5 angular units, where 1 angular unit is (360/81)=4.444 degrees. Dummy-slot portions are provided on the faces of the short-teeth and the long-teeth so that the winding slots and the dummy-slot portions are positioned at intervals of 1 angular unit.

In the cases of the above embodiments, the number of the teeth in each of the short-blocks is larger than that in each of the long-blocks, but the construction of the rotating electric motor of the invention having reduced cogging torque is not limited to such cases. Generally speaking, the cogging torque can be reduced by providing a rotating electric motor which comprises: a field permanent magnet member of a circular form having permanently magnetized N and S poles alternately positioned around a rotary shaft of said rotary electric motor, the number of said N and S poles being P which is an even number; and an armature core made of a magnetic material having a plurality of teeth arranged between two adjacent winding slots where a plurality of overlapping winding coils of polyphase winding groups are wound, the number of said teeth being T which is not less than 2P, and the number of the phases of said polyphase winding groups being H which is not less than 2; wherein said armature core has at least a pair of short-blocks and long-blocks alternately positioned around said rotary shaft, each short-block having at least one short-tooth and no long-tooth, and each long-block having at least two long-teeth and no short-tooth, where the effective pitch of each short-tooth is smaller than $D=(360/T)$ degrees and the effective pitch of each long-teeth is larger than D.

It is preferable that the number of the pairs of short-blocks and long-blocks is an integral multiple of H. It is also preferable that the whole effective pitch of sequential H pairs of short-blocks and long-blocks is equal or almost equal to (360/P)Q degrees, and the number of said teeth at a pair of neighboring short-blocks and long-blocks in said sequential H pairs is an integral multiple of Q, where Q is an integer not less than 2 and preferably not equal to an integral multiple of H. It is preferable that the number of said teeth in a pair of neighboring short-blocks and long-blocks is not equal to an integral multiple of H. It is also preferable that the ratio of the effective pitch of each of said short-tooth to the effective pitch of each of said long-tooth is R:R+1, where R is an integer and preferably not larger than 4. It is also preferable that at least one of said long-teeth has at least one dummy-slot portion in the face thereof opposed to said magnet member. It is also preferable that the ratio of the effective pitch of each of said short-teeth to the effective pitch of each of said long-teeth is R:R+1, where R is an integer, and said dummy-slot portions and said winding slots are positioned at intervals of equal or almost equal angles around said rotary shaft.

Other constructions of the rotating electric motor of the invention having reduced cogging torque are shown in Table 2. which shows the effective pitches of teeth.

TABLE 2

(A) 2 2 2 2 2 2 2 1 2 2 2 2 2 2 2 1 2 2 2 2 2 2 2 1
(B) 3 3 3 3 3 3 3 2 3 3 3 3 3 3 3 2 3 3 3 3 3 3 3 2
(C) 4 4 4 4 4 4 4 1 4 4 4 4 4 4 4 1 4 4 4 4 4 4 4 1
(D) 3 3 3 3 3 3 1 2 3 3 3 3 3 3 1 2 3 3 3 3 3 3 1 2
(E) 4 4 4 4 4 4 2 3 4 4 4 4 4 4 2 3 4 4 4 4 4 4 2 3

In Table 2, arrangement (A) shows another arrangement of the teeth of the armature core 24 shown in FIG. 5 and FIG. 7. Each of the long-blocks has 7 long-teeth and each of the short-blocks has 1 short tooth. Each of the effective pitches of the short-teeth is equal to 1 angular unit and each of the effective pitches of the long-teeth is equal to 2 angular units, where 1 angular unit is (360/45)=8 degrees. Dummy-slot portions are provided on the faces of the long-teeth so that the winding slots and the dummy-slot portions are positioned at intervals of 1 angular unit.

Arrangement 2(B) shows still another arrangement of the teeth of the armature core 24 shown in FIG. 5 and FIG. 7. Each of the long-blocks has 7 long-teeth and each of the short-blocks has 1 short-tooth. Each of the effective pitches of the short-teeth is equal to 2 angular units and each of the effective pitches of the long-teeth is equal to 3 angular units, where 1 angular unit is (360/69)=5.217 degrees. Dummy-slot portions are provided on the faces of the short-teeth and the long-teeth so that the winding slots and the dummy-slot portions are positioned at intervals of 1 angular unit.

Arrangement (C) shows yet another arrangement of the teeth of the armature core 24 shown in FIG. 5 and FIG. 7. Each of the long-blocks has 7 long-teeth and each of the short-blocks has 1 short-tooth. Each of the effective pitches of the short-teeth is equal to 1 angular unit and each of the effective pitches of the long-teeth is equal to 4 angular units, where 1 angular unit is (360/87)=4.138 degrees. Dummy-slot portions are provided on the faces of the long-teeth so that the winding slots and the dummy-slot portions are positioned at intervals of 1 angular unit.

Arrangement (D) shows a further arrangement of the teeth of the armature core 24 shown in FIG. 5 and FIG. 7. Each of the long-blocks has 6 long-teeth and each of the short-blocks has 2 short-teeth. The effective pitches of the short-teeth are equal to 1 angular unit or 2 angular units and the effective pitches of the long-teeth are equal to 3 angular units, where 1 angular unit is (360/63)=5.714 degrees. Dummy-slot portions are provided on the faces of the long-teeth and the short-teeth so that the winding slots and the dummy-slot portions are positioned at intervals of 1 angular unit.

Arrangement (E) shows a still further arrangement of the teeth of the armature core 24 shown in FIG. 5 and FIG. 7. Each of the long-blocks has 6 long-teeth and each of the short-blocks has 2 short-teech. The effective pitches of the short-teeth are equal to 2 or 3 angular units and effective pitchs of the long-teeth are equal to 4 angular units, where 1 angular unit is (360/87)=4.138 degrees. Dummy-slot portions are provided on the faces of the short-teeth and the long-teeth so that the winding slots and the dummy-slot portions are positioned at intervals of 1 angular unit.

In the cases of the above embodiments, 3 pairs of short-blocks and long-blocks are symmetrically positioned around the rotary axis, but the construction of the rotating electric motor of the invention having reduced cogging torque is not limited to such cases. Generally speaking, cogging torque can be reduced by providing a rotating electric motor which comprises: a field permanent magnet member of a circular form having permanently magnetized N and S poles alternately positioned around a rotary shaft of said rotary electric motor, the number of said N and S poles being P which is an even number; and an armature core made of a magnetic material having a plurality of teeth arranged between two adjacent winding slots where a plurality of overlapping winding coils of polyphase winding groups are wound, the number of said teeth being T which is not less than 2P, and the number of the phases of said polyphase winding groups being H which is not less than 2; wherein said armature core has at least one short-tooth and at least one long-tooth, the effective pitch of each short-tooth being smaller than $D=(360/T)$ degrees, and the smaller effective pitch of each long-tooth being larger than D; and wherein the whole effective pitch of sequential L teeth of said armature core is equal or almost equal to $(360/P)Q$ degrees, where L is an integer larger than H and Q is an integer not less than 2, and the ratio of the smallest value of the effective pitches of the teeth to the effective pitch of the m-th tooth in said sequential L teeth is R:R+Vm, where R is an integer not less than 1 and Vm is an integer including 0, the sum of Vm from m=1 to m=L being W which is not equal to an integral multiple of Qd, where Qd is a divisor of Q and larger than 1.

It is preferable that $W=Qd-1$ or $W=Qd+1$. It is also preferable that $W=Qm-1$ or $W=Qm+1$, where Qm is an integral multiple of Q. It is also preferable that at least one of said long-teeth has at least one dummy-slot portion in the face thereof opposed to said magnet member. It is also preferable that said dummy-slot portions and said winding slots in said sequential L teeth are positioned at equal or almost equal angles around said rotary shaft by 1/R of the smallest value to the effective pitches of said teeth in said sequential L teeth.

For example, $Q=P=4$, $L=24$, $R=1$ and $W=Q-1=3$ in the case of the embodiment of FIG. 5; $Q=4$, $L=24$, $R=3$ and $W=2Q+1=9$ in the arrangement (E) of Table 1; $Q=4$, $L=24$, $R=1$ and $W=5Q+1=21$ in the case of the arrangement (A) of Table 2; $Q=4$, $L=24$, $R=2$ and $W=10Q-1=39$ in the case of the arrangement (E) of Table 2.

Other constructions of the rotating electric motor of the invention having reduced cogging torque are shown in Table 3. which shows the effective pitches of teeth.

TABLE 3

(A) 1 1 1 1 1 1 1 2 1 1 1 1 1 1 1 1 1 1 1 1 1 1 1 1
(B) 1 1 1 1 1 1 1 4 1 1 1 1 1 1 1 1 1 1 1 1 1 1 1 1
(C) 2 2 2 2 2 2 2 3 2 2 4 2 2 2 2 2 2 2 2 2 2 2 2 2
(D) 2 2 2 2 2 2 2 1 2 2 2 2 2 2 2 2 2 2 2 2 2 2 2 2
(E) 4 4 4 4 4 4 4 1 4 4 4 4 4 4 4 4 4 4 4 4 4 4 4 4
(F) 3 3 3 3 3 3 3 2 3 3 1 3 3 3 3 3 3 3 3 3 3 3 3 3

In Table 3, arrangement (A) shows another arrangement of the teeth of the armature core 24 shown in FIG. 5 and FIG. 7. The armature core has only one pair of short-blocks and long-blocks. The long-block has 1 long-tooth and the short-block has 23 short-teeth. Each of the effective pitches of the short-teeth is equal to 1 angular unit and the effective pitch of the long-tooth is equal to 2 angular units, where 1 angular unit is $(360/25)=14.4$ degrees. Thus, $Q=4$, $L=24$, $R=1$ and $W=1$. A dummy-slot portion is provided on the face of the long-tooth so that the winding slots and the dummy-slot portion are positioned at intervals of 1 angular unit.

Arrangement (B) shows still another arrangement of the teeth of the armature core 24 shown in FIG. 5 and FIG. 7. The armature core has only one pair of short-blocks and long-blocks. The long-block has 1 long-tooth and the short-block has 23 short-teeth. Each of the effective pitches of the short-teeth is equal to 1 angular unit and the effective pitch of the long-tooth is equal to 4 angular units, where 1 angular unit is $(360/27)=13.333$ degrees. Thus, $Q=4$, $L=24$, $R=1$ and $W=3$. Dummy-slot portions are provided on the faces of the long-tooth so that the winding slots and the dummy-slot portions are positioned at intervals of 1 angular unit.

Arrangement (C) shows yet another arrangement of the teeth of the armature core 24 shown in FIG. 5 and FIG. 7. The armature core has two pairs of short-blocks and long-blocks. Each of the long-blocks has 1 long-tooth and the short-blocks have 2 or 20 short-teeth. Each of the effective pitches of the short-teeth is equal to 2 angular units and the effective pitches of the long-teeth are equal to 3 or 4 angular units, where 1 angular unit is $(360/51)=7.059$ degrees. Thus, $Q=4$, $L=24$, $R=2$ and $W=3$. Dummy-slot portions are provided on the faces of the short-teeth and the long-teeth so that the winding slots and the dummy-slot portions are positioned at intervals of 1 angular units.

Arrangement (D) shows a further arrangement of the teeth of the armature core 24 shown in FIG. 5 and FIG. 7. The armature core has only one pair of short-blocks and long-blocks. The long-block has 23 long-teeth and the short-block has 1 short-tooth. Each of the effective pitches of the long-teeth is equal to 2 angular units and the effective pitch of the short-tooth is equal to 1 angular unit, where 1 angular unit is $(360/47)=7.660$ degrees. Thus, $Q=4$, $L=24$, $R=1$ and $W=23$. Dummy-slot portions are provided on the faces of the long-teeth so that the winding slots and the dummy-slot portions are positioned at intervals of 1 angular unit.

Arrangement (E) shows a still further arrangement of the teeth of the armature core 24 shown in FIG. 5 and FIG. 7. The armature core has only one pair of short-blocks and long-blocks. The long-block has 23 long-teeth and the short-block has 1 short-tooth. Each of the effective pitches of the long-teeth is equal to 4 angular units and the effective pitch of the short-tooth is equal to 1 angular units, where 1 angular unit is $(360/93)=3.871$ degrees. Thus, $Q=4$, $L=24$, $R=1$, and $W=69$. Dummy-slot portions are provided on the faces of the long-teeth so that the winding slots and the dummy-slot portions are positioned at intervals of 1 angular unit.

Arrangement (F) shows further another arrangement of the teeth of the armature core 24 shown in FIF. 5 and FIG. 7. The armature core has two pairs of the short-blocks and long-blocks. Each of the short-blocks has 1 short-tooth and the long-blocks have 2 or 20 long-teeth. Each of the effective pitches of the long-teeth is equal to 3 angular units and the effective pitches of the short-teeth are equal to 1 or 2 angular units, where 1 angular unit is $(361/69)=5.217$ degrees. Thus, $Q=4, L=24$, $R=1$, and $W=45$. Dummy-slot portions are provided on the faces of the long-teeth and one of the short-teeth so that the winding slots and the dummy-slot portions are positioned at intervals of 1 angular unit.

Embodiments of the Invention with the relationship T=3P

Figure 3:
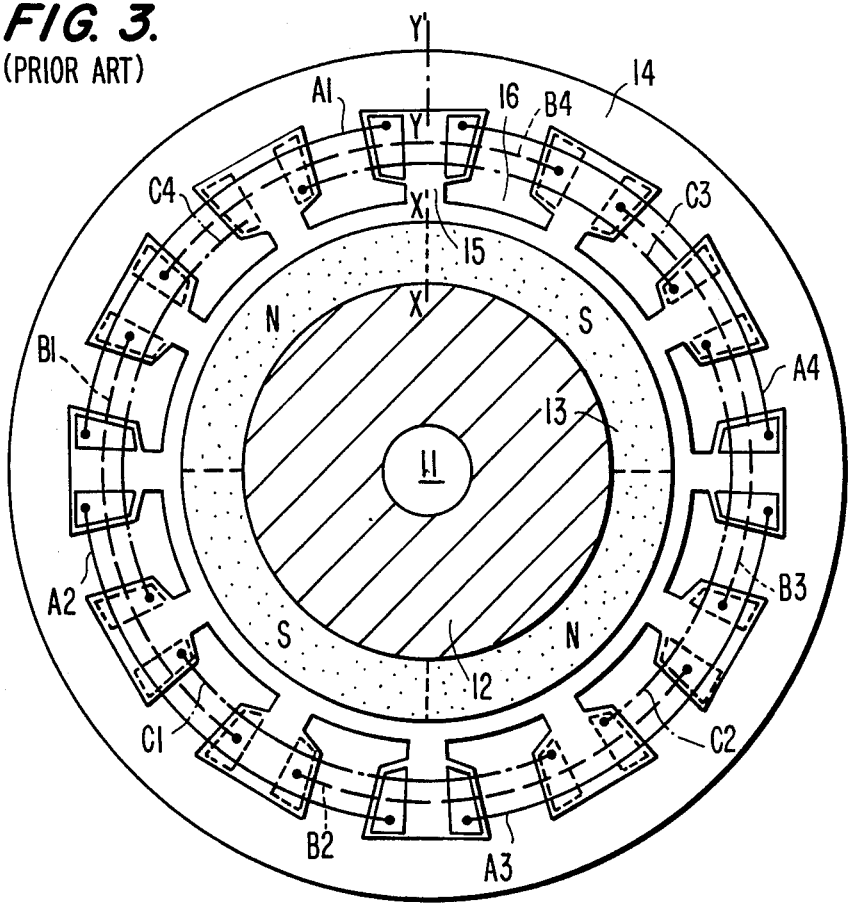
FIG. 3 is a schematic sectional view of another conventional rotating electric motor with T=3P.
Figure 4:
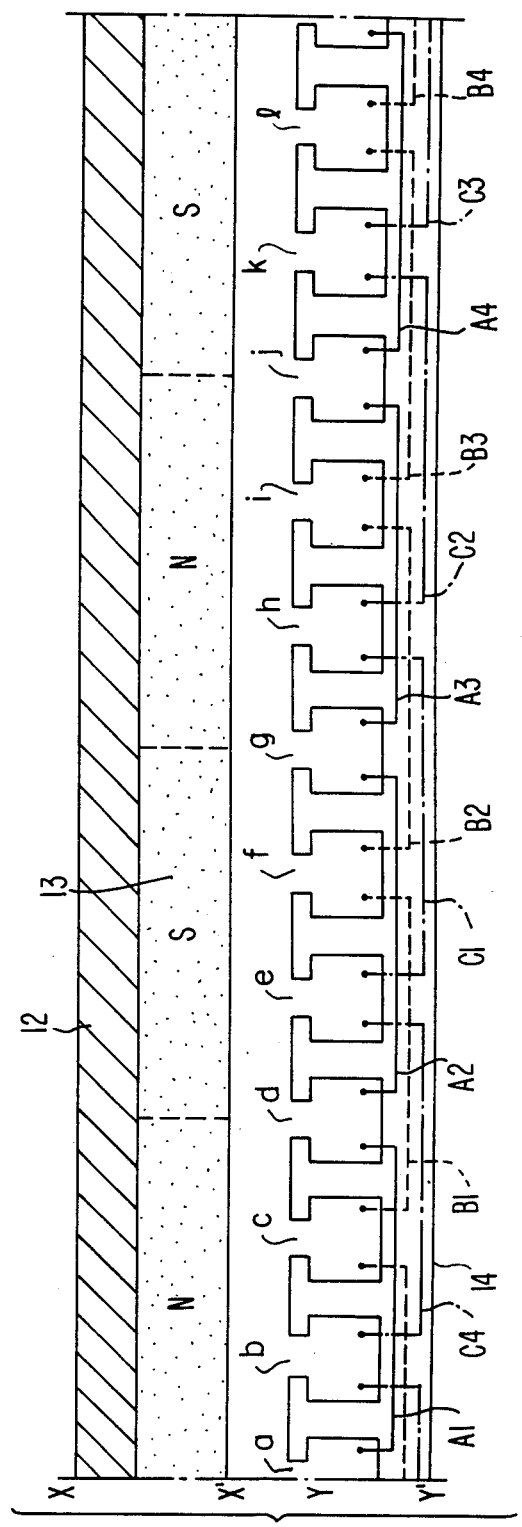
FIG. 4 is a development view of the conventional rotating electric motor of FIG. 3 developed at the lines X-X' and Y-Y'.
Figure 13:
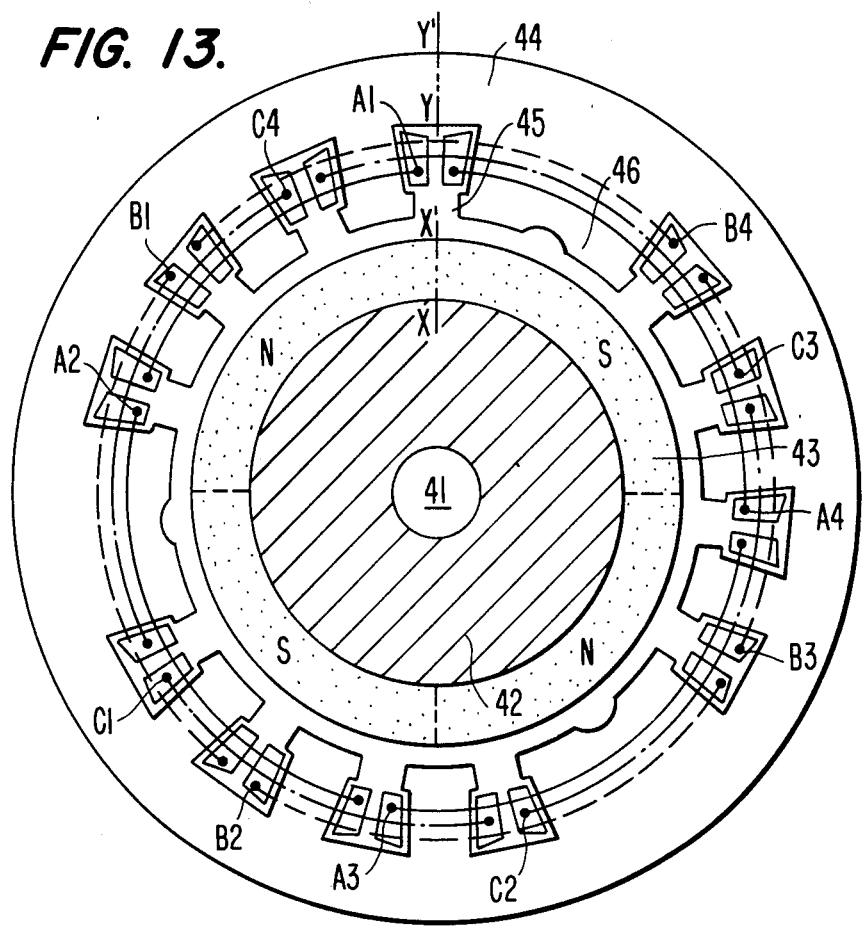
FIG. 13 is a schematic sectional view of another embodiment of the rotating electric motor of the invention with the relationship T=3P.

FIG. 13 is a schematic sectional view of another embodiment of a brushless DC motor of the invention with the relationship T=3P, which corresponds to the conventional rotating electric motor shown in FIG. 3 and FIG. 4. In FIG. 13, a cylindrical permanent magnet 43 is fixed to the outer circumference of a rotor 42 made of magnetic material, and the permanent magnet 43 rotates with the rotor 42 around a rotary shaft 41. The permanent magnet 43 has 4 poles of alternating N and S poles positioned at intervals of an equal angle of 90 degrees that is, P=4, The distribution of the magnetic flux density of the permanent magnet 43 is the same as that shown in FIG. 6. The teeth 46 of an armature core 44, each of which is formed between two adjacent winding slots 45, are faced to the poles of the permanent magnet 43. The rotary shaft 41 of the rotor 42 is rotatably supported by the armature core 44. Therefore, the relative position between the teeth 46 of the armature core 44 and the poles of the permanent magnet 43 changes according to the rotation of the rotor 42.

Figure 14:
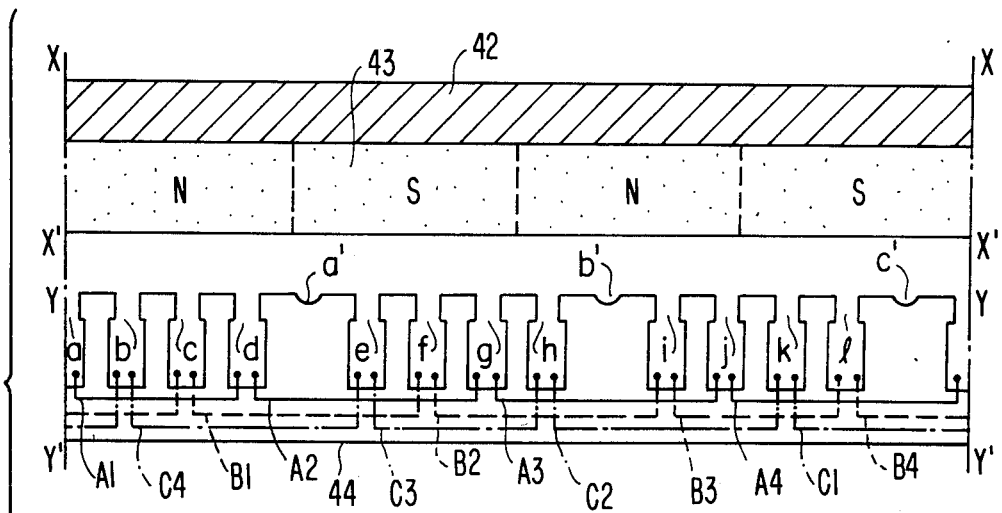
FIG. 14 is a development view of the rotating electric motor of FIG. 13 developed at the lines X-X' and Y-Y'.

FIG. 14 shows a development view of the brushless DC motor of the invention of FIG. 13 developed at the lines X—X' and Y—Y', when these lines are in a line. The armature core 44 has 12 winding slots a, b, c, d, e, f, g, h, i, j, k and l, and 12 teeth is provided between two adjacent winding slots, that is, T=12. The armature core 44 also has 3 dummy-slot portions a',b' and c' at the faces of some of the teeth opposed to the permanent magnet 43, and no coils are wound in the dummy-slot portions. Overlapping winding coils A1, A2, A3, A4, B1, B2, B3, B4, C1, C2, C3 and C4 are wound in the winding slots a to l. Each of the winding coils A1 to C4 encircles 3 teeth of the armature core 44. That is, A1 is wound in the winding slots a and d, A2 is wound in the winding slots d and g, A3 is wound in the winding slots g and j, A4 is wound in the winding slots j and a, B1 is wound in the winding slots c and f, B2 is wound in the winding slots f and i, B3 is wound in the winding slots i and l, B4 is wound in the winding slots l and c, C1 is wound in the winding slots e and h, C2 is wound in the winding slots h and k, C3 is wound in the winding slots k and b, and C4 is wound in the winding slots b and e. The winding coils A1,A2,A3 and A4 are connected in series to form a winding group A of the first phase, the winding coils B1,B2,B3 and B4 are connected in series to form a winding group B of the second phase, and the winding coils C1,C2,C3 and C4 are connected in series to form a winding group C of the third phase. As will be described later, the phase differences among the winding groups A,B and C are exactly equal to 120el degrees (electrical degrees), where 180el is equivlent to the 1 pole pitch (360/P) degrees. In FIG. 13, P=4, then 180el is equivalent to 90 degrees (mechanical degrees), which is the same as that of the conventional motor of FIG. 3. Therefore, a torque accelerating the rotor 42 is obtained by supplying three phase currents to the three phase winding groups A, B and C. The electronic distributor 30 shown in FIG. 8 is also usable for the brushless DC motor of the invention of FIG. 13.

In FIG. 14, since the winding slots a to l are positioned at intervals of unequal angles, the effective pitches of the teeth are not the same. In the case of $T=3P=12$ ($P=4$), the standard effective pitch is $D32$ $(360/T)=30$ degrees when all of the winding slots are positioned at intervals of an equal angle. So, a short-tooth has the effective pitch smaller than D, and a long-tooth has the effective pitch larger than D. In FIG. 14, the teeth a-b, b-c, c-d, e-f, f-g, g-h, i-j, j-k and k-l are short-teeth, and the teeth d-e,h-i and l-a are long-teeth. There are three short-blocks $<a,d>$, $<e,h>$ and $<i,l>$, which are the short-block of the teeth a-b,b-c, and c-d, the short-block of the teeth e-f,f-g and g-h, and the short-block of the teeth i-j,j-k and k-l, respectively. There are three long-blocks $<d,e>$, $<h,i>$ and $<l,a>$ that are the long-block of the tooth d-e, the long-block of the tooth h-i, and the long-block of the tooth l-a, respectively.

Each of the short-blocks $<a,d>$, $<e,h>$ and $<i,l>$ has 3 short-teeth, and each of the long-blocks $<d,e>$, $<h,i>$ and $<l,a>$ has only one long-tooth. The armature core 44 of the brushless DC motor of the invention shown in FIG. 13 and FIG. 14 has 3 pairs of short-blocks and long-blocks positioned alternately around the rotary shaft 41, and these 3 pairs of short-blocks and long-blocks are symmetrical with respect to the rotary shaft 41.

Each of the effective pitches of the short-teeth a-b, b-c, c-d, e-f, f-g, g-h, i-j, j-k and k-l is equal or nearly equal to $(360/15)=24$ degree, and each of the effective pitches of the long-teeth d-e,h-i and l-a is equal or nearly equal to $(720/15)=48$ degrees. Thus, the ratio of the effective pitch of each of the short-teeth to the effective pitch of each of the long-teeth is 1:2. The long-tooth d-e has a dummy-slot portion a' at its center portion faced to the poles of the permanent magnet 43, the long-tooth h-i has a dummy-slot portion b' at its center portion, and the long-tooth l-a also has a dump-slot portion c' at its center portion. Therefore, the winding slots a to l and the dummy-slot portions a' to c' are positioned at intervals of an equal or nearly equal angle of $(360/15)=24$ degrees.

Figure 15:
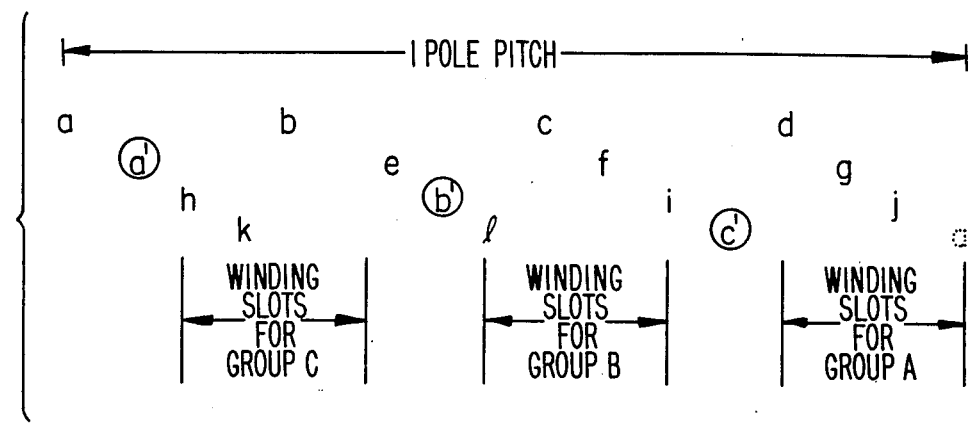
FIG. 15 is a phase diagram of the winding slots and the dummy-slot portions of the armature core with the period of the 1 pole pitch of the permanent magnet about the rotating electric motor of the invention shown in FIG. 13 and FIG. 14.

Next, the cogging torque of the embodiment of the invention shown in FIG. 13 will be explained hereinbelow. FIG. 15 shows phases of the winding slots a to l and the dummy-slot portions a' to c' of the armature core 44 with the period of 1 pole pitch of the permanent magnet 43. The winding slots a,d,g and j, where the winding coils A1,A2,A3 and A4 of the winding group A are wound, and the dummy-slot portion c' are positioned at intervals of a phase difference of (1 pole pitch)/15. That is, the phases of the winding slots a,d,g and j and the dummy-slot portion c' differ from each other by (1 pole pitch)/15, and the range of the phase of the winding slots a,d,g and j is smaller than (1 pole pitch)/3. Similarly, the winding slots c,f,i and l, where the winding coils B1,B2,B3 and B4 of the winding group B are wound, and the dummy-slot portion b' are positioned at intervals of the same phase difference of (1 pole pitch)/15, and the range of the phases of the winding slots c,f,i and l is smaller than (1 pole pitch)/3. Similarly, the winding slots b,e,h and k, where the winding coils C1,C2,C3 and C4 of the winding group C are wound, and the dummy-slot portion a' are positioned at intervals of the same phase difference of (1 pole pitch)/15, and the range of the phase of the winding slots b,e,h and k is smaller than (1 pole pitch0/3. Further, the phase differences among the winding slot group (a,d,g,j) for the winding group A, the winding slot group (c,f,i,l) for the winding group B and the winding slot group (b,e,h,k) for the winding group C are exactly equal to (1 pole pitch)/3. As the result of this, the phase differences among the three phase winding groups A, B and C are exactly equal to 120el degrees, and a smooth torque is obtained by using the distributor 30 of FIG. 8.

Figure 16:
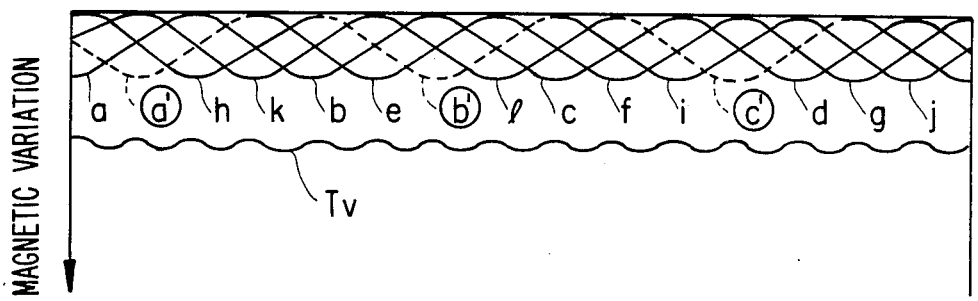
FIG. 16 is a diagram showing a composite magnetic variation of the rotating electric motor of the invention shown in FIG. 13 and FIG. 14.

All of the phase of the winding slots a to l and the dummy-slot portions a' to c' are different from each other by the phase difference of (1 pole/pitch)/15, and it is expected that the composite magnetic variation with the period of 1 pole pitch becomes small. FIG. 16 shows waveforms of the magnetic variations of the winding slots a to l and the dummy-slot portions a' to c' and a waveform of the composite magnetic variation Tv of the armature core 44. The magnetic variation of each of the winding slots and dummy-slot portions changes smoothly corresponding to the each opening width, and each of the dummy-slot portions a′,b′ and c′ has same magnetic effect as that of each of the winding slots a to l. Since the phases of the winding slots and the dummy-slot portions differ from each other by (1 pole pitch)/15, the composite magnetic variation Tv becomes very small.

Figure 17:
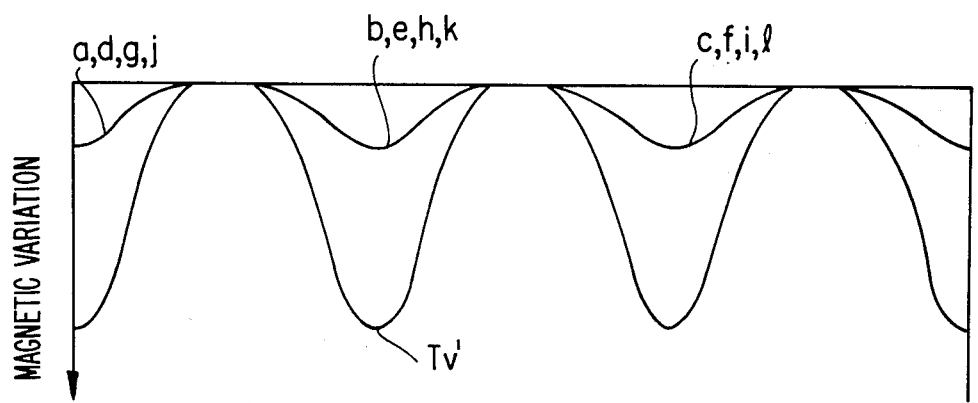
FIG. 17 is a diagram showing a composite magnetic variation of the conventional rotating electric motor shown in FIG. 3 and FIG. 4.

FIG. 17 shows a waveform of the composite magnetic variation Tv′ of the armature core 15 of the conventional rotating electric motor shown in FIG. 3 and FIG. 4. In the case of the conventional rotating electric motor, the phases of the winding slots a,d,g and j are same with the period of the 1 pole pitch, the phases of the winding slots b,e,h and k are same, and the phases of the winding slots c,f,i and l are same. So, the composite magnetic variation Tv′ is large. Comparing the composite magnetic variation Tv of FIG. 16 with the composite magnetic variation Tv′ of FIG. 17. Tv of the motor of the invention is much smaller than Tv′ of the conventional motor. Therefore, the embodiment of the brushless DC motor of the invention shown in FIG. 13 has a low cogging torque. Notice that the cogging torque of the brushless DC motor of FIG. 13 without the dummy-slot portions is also small, because the composite magnetic variation of the armature core 44 without the dummy-slot portions is smaller than the composite magnetic variation Tv′ of the conventional armature core 14 shown in FIG. 17.

The winding coils A1, A2, A3, A4, B1, B2, B3, B4, C1, C2, C3 and C4 of the armature core 44 in the above embodiment can be automatically wound by a winding machine, because the winding pitches of these winding coils are almost equal to the 1 pole pitch of the permanent magnet 43. The winding pitches of these winding coils A1 to C4 are between 144el and 192el degrees. More specifically, the winding pitches of the winding coils A1, A2, A3, A4, B1, B2, B3, B4, C1, C2, C3 and C4 are 144el, 192el, 192el, 192el, 192el, 192el, 144el, 192el, 144el, 192el, 192el and 192el, respectively.

Other constructions of the rotating electric motor of the invention having reduced cogging torque are shown in Table 4 which shows the effective pitches of the teeth.

TABLE 4

| | |
|---|---|
| (A) | 2 2 2 3 2 2 2 3 2 2 2 3 |
| (B) | 3 3 3 4 3 3 3 4 3 3 3 4 |
| (C) | 1 1 1 4 1 1 1 4 1 1 1 4 |
| (D) | 1 1 2 3 1 1 2 3 1 1 2 3 |
| (E) | 3 3 4 5 3 3 4 5 3 3 4 5 |

In Table 4, arrangement (A) shows another arrangement of the teeth of the armature core 44 shown in FIG. 13 and FIG. 14. Each of the effective pitches of the short-teeth is changed to be equal to 3 angular units and each of the effective pitches of the long-teeth is changed to be equal to 3 angular units, where 1 angular unit is (360/27)=13.333 degrees. Thus, Q=4, L=12, R=2 and W=3. Dummy-slot portions are provided on the faces of the short-teeth and the long-teeth so that the winding slots and the dummy-slot portions are positioned at intervals of 1 angular unit.

Arrangement (B) shows still another arrangement of the teeth of the armature core 44 shown in FIG. 13 and FIG. 14. Each of the effective pitches of the short-teeth is changed to be equal to 3 angular units and each of the effective pitches of the long-teeth is changed to be equal to 4 angular units, where 1 angular unit is (360/39)=9.231 degrees. Thus, Q=4, L=12, R=3 and W=3. Dummy-slot portions are provided on the faces of the short-teeth and the long-teeth so that the winding slots and the dummy-slot portions are positioned at intervals of 1 angular unit.

Arrangement (C) shows yet another arrangement of the teeth of the armature core 44 shown in FIG. 13 and FIG. 14. Each of the effective pitches of the short-teeth is equal to 1 angular unit and each of the effective pitches of the long-teeth is changed to be equal to 4 angular units, where 1 angular unit is (360/21)=17.143 degrees. Thus, Q=4, L=12, R=1 and W=9. Dummy-slot portions are provided on the faces of the long-teeth so that the winding slots and the dummy-slot portions are positioned at intervals of 1 angular unit.

Arrangement (D) shows a further arrangement of the teeth of the armature core 44 shown in FIG. 13 and FIG. 14. Each of the short-blocks has 2 short-teeth and each of the long-blocks has 2 long-teeth. Each of the effective pitches of the short-teeth is equal to 1 angular unit and the effective pitches of the long-teeth are equal to 23 or 3 angular units, where 1 angular unit is (360/21)=17.143 degrees. Thus, Q=4, L=12, R=1 and W32 9, Dummy-slot portion are provided on the faces of the long-teeth so that the winding slots and the dummy-slots portions are positioned at intervals of 1 angular unit.

Arrangement (E) shows a still further arrangement of the teeth of the armature core 44 shown in FIG. 13 and FIG. 14. Each of the short-blocks has 2 short-teeth and each of the long-blocks has 2 long-teeth. Each of the effective pitches of the short-teeth is equal to 3 angular units and the effective pitches of the long-teeth are equal to 4 or 5 angular units, where 1 angular unit is (360/45)=8 degrees. Thus, Q=4, L=12, R=3 and W=9. Dummy-slot portions are provided on the faces of the short-teeth and the long-teeth so that the winding slots and the dummy-slot portions are positioned at intervals of 1 angular unit.

In the cases of the above embodiments with the relationship T=3P, the number of the teeth in each of the short-blocks is larger than that in each of the long-blocks, but the construction of the rotating electric motor of the invention having a reduced cogging torque is not limited to such cases.

Other constructions of the rotating electric motor of the invention having reduced cogging torque are shown in Table 5 which shows the effective pitches of the teeth.

TABLE 5

| | |
|---|---|
| (A) | 2 2 2 1 2 2 2 1 2 2 2 1 |
| (B) | 3 3 3 2 3 3 3 2 3 3 3 2 |
| (C) | 4 4 4 1 4 4 4 1 4 4 4 1 |
| (D) | 3 3 1 2 3 3 1 2 3 3 1 2 |
| (E) | 4 4 2 3 4 4 2 3 4 4 2 3 |

In Table 5, arrangement (A) shows another arrangement of the teeth of the armature core 44 shown in FIG. 13 and FIG. 14. Each of the long-blocks has 3 long-teeth and each of the short-blocks has 1 short-tooth. Each of the effective pitches of the short-teeth is equal to 1 angular unit and each of the effective pitches of the long-teeth is equal to 2 angular units, where 1 angular unit is (360/21)=17.143 degrees. Thus, Q=4, L=12, R=1 and W=9. Dummy-slot portions are provided on the faces of the long-teeth so that the winding slots and the dummy-slot portions are positioned at intervals of 1 angular unit.

Arrangement (B) shows still another arrangement of the teeth of the armature core 44 shown in FIG. 13 and FIG. 14. Each of the long-blocks has 3 long-teeth and each of the short-blocks has 1 short-tooth. Each of the effective pitches of the short-teeth is equal to 2 angular units and each of the effective pitches of the long-teeth is equal to 3 angular units, where 1 angular unit is $(360/33) = 10.909$ degrees. Thus, $Q=4$, $L=12$, $R=2$ and $W=9$. Dummy-slot portions are provided on the faces of the short-teeth and the long-teeth so that the winding slots and the dummy-slot portions are positioned at intervals of 1 angular unit.

Arrangement (C) shows yet another arrangement of the teeth of the armature core 44 shown in FIG. 13 and FIG. 14. Each of the long-blocks has 3 long-teeth and each of the short-blocks has 1 short-tooth. Each of the effective pitches of the short-teeth is equal to 1 angular unit and each of the effective pitches of the long-teeth is equal to 4 angular units, where 1 angular unit is $(360/39) = 9.231$ degrees. Thus, $Q=4$, $L=12$, $R=1$ and $W=27$. Dumm-slot portions are provided on the faces of the long-teeth so that the winding slots and the dummy-slot portions are positioned at intervals of 1 angular unit.

Arrangement (D) shows a further arrangement of the teeth of the armature core 44 shown in FIG. 13 and FIG. 14. Each of the long-blocks has 2 long-teeth and each of the short-blocks has 2 short-teeth. The effective pitches of the short-teeth are equal to 1 or 2 angular units and the effective pitches of the long-teeth are equal to 3 angular units, where 1 angular unit is $(360/27) = 13.333$ degrees. Thus, $Q=4$, $L=12$, $R=1$ and $W=15$. Dummy-slot portions are provided on the faces of the long-teeth and the short-teeth so that the winding slots and the dummy-slot portions are positioned at intervals of 1 angular unit.

Arrangement (E) shows a still further arrangement of the teeth of the armature core 44 shown in FIG. 13 and FIG. 14. Each of the long-blocks has 2 long-teeth and each of the short-blocks has 2 short-teeth. The effective pitches of the short-teeth are equal to 2 or 3 angular units and the effective pitches of the long-teeth are equal to 4 angular units, where 1 angular unit is $(360/39) = 9.231$ degrees. Thus, $Q=4$, $L=12$, $R=1$ and $W=15$. Dummy-slot portions are provided on the faces of the short-teeth and the long-teeth so that the winding slots and the dummy-slot portions are positioned at intervals of 1 angular unit.

In the cases of the above embodiments with the relationship $T=3P$, 3 pairs of short-blocks and long-blocks are symmetrically positioned around the rotary shaft, but the construction of the rotating electric motor of the invention having reduced cogging torque is not limitted to such cases.

Other construction of the rotating electric motor of the invention having reduced cogging torque are shown in Table 6 which shows the effective pitches the teeth.

TABLE 6

| | |
|---|---|
| (A) | 1 1 1 2 1 1 1 1 1 1 1 1 |
| (B) | 1 1 1 4 1 1 1 1 1 1 1 1 |
| (C) | 2 2 2 3 2 2 4 2 2 2 2 2 |
| (D) | 2 2 2 1 2 2 2 2 2 2 2 2 |
| (E) | 4 4 4 1 4 4 4 4 4 4 4 4 |
| (F) | 3 3 3 2 3 3 1 3 3 3 3 3 |

In Table 6, arrangement (A) shows another arrangement of the teeth of the armature core 44 shown in FIG. 13 and FIG. 14. The armature core has only one pair of short-blocks and long-blocks. The long-block has 1 long-tooth and the short-block has 11 short-teeth. Each of the effective pitches of the short-teeth is equal to 1 angular unit and the effective pitch of the long-tooth is equal to 2 angular units, where 1 angular unit is $(360/13) = 27.692$ degrees. Thus, $Q=4$, $L=12$, $R=1$ and $W=1$. A dummy-slot portion is provided on the face of the long-tooth so that the winding slots and the dummy-slot portion are positioned at intervals of 1 angular unit.

Arrangement (B) shows still another arrangement of the teeth of the armature core 44 shown in FIG. 13 and FIG. 14. The armature core has only one pair of short-blocks and long-blocks. The long-block has 1 long-tooth and the short-block has 11 short-teeth. Each of the effective pitches of the short-teeth is equal to 1 angular unit and the effective pitch of the long-tooth is equal to 4 angular units, where 1 angular unit is $(360/15) = 24$ degrees. Thus, $Q=4$, $L=12$, $R=1$ and $W=3$. Dummy-slot portions are provided on the faces of the long-tooth so that the winding slots and the dummy-slot portions are positioned at intervals of 1 angular unit.

Arrangement (C) shows yet another arrangement of the teeth of the armature core 44 shown in FIG. 13 and FIG. 14. The armature core has two pairs of short-blocks and long-blocks. Each of the long-blocks has 1 long-tooth and the short-blocks have 2 or 8 short-teeth. Each of the effective pitches of the short-teeth is equal to 2 angular units and the effective pitches of the long-teeth are equal to 3 or 4 angular units, where 1 angular unit is $(360/27) = 13.333$ degrees. Thus, $Q=4$, $L=12$, $R=2$ and $W=3$. Dummy-slot portions are provided on the faces of the short-teeth and the long-teeth so that the winding slots and the dummy-slot portions are positioned at intervals of 1 angular unit.

Arrangement (D) shows a further arrangement of the teeth of the armature core 44 shown in FIG. 13 and FIG. 14. The armature core has only one pair of short-blocks and long-blocks. The long-block has 11 long-teeth and the short-block has 1 short-tooth. Each of the effective pitches of the long-teeth is equal to 2 angular units and the effective pitch of the short-tooth is equal to 1 angular unit, where 1 angular unit is $(360/23) = 15.652$ degrees. Thus, $Q=4$, $L=12$, $R=1$ and $W=11$. Dummy-slot portions are provided on the faces of the long-teeth so that the winding slots of the dummy-slot portions are positioned at intervals of 1 angular unit.

Arrangement (E) shows a still further arrangement of the teeth of the armature core 44 shown in FIG. 13 and FIG. 14. The armature core has only one pair of short-blocks and long-blocks. The long-block has 11 long-teeth and the short-block has 1 short-tooth. Each of the effective pitches of the long-teeth is equal to 4 angular units and the effective pitch of the short-tooth is equal to 1 angular unit, where 1 angular unit is $(360/45) = 8$ degrees. Thus, $Q=4$, $L=12$, $R=1$ and $W=33$. Dummy-slot portions are provided on the faces of the long-teeth so that the winding slots and the dummy-slot portions are positioned at intervals of 1 angular unit.

Arrangement (F) shows further another arrangement of the teeth of the armature core 44 shown in FIG. 13 and FIG. 14. The armature core has two pairs of short-blocks and long-blocks. Each of the short-blocks has 1 short-tooth and the long-blocks have 2 or 8 long-teeth. Each of the effective pitches of the long-teeth is equal to 3 angular units and the effective pitches of the short-teeth are equal to 1 or 2 angular units, where 1 angular unit is (360/33)=10,909 degrees. Thus, Q=4, L=12, R=1 and W=21. Dummy-slot portions are provided on the faces of the long-teeth and one of the short-teeth so that the winding slots and the dummy-slot portions are positioned at intervals of 1 angular unit.

Figure 18:
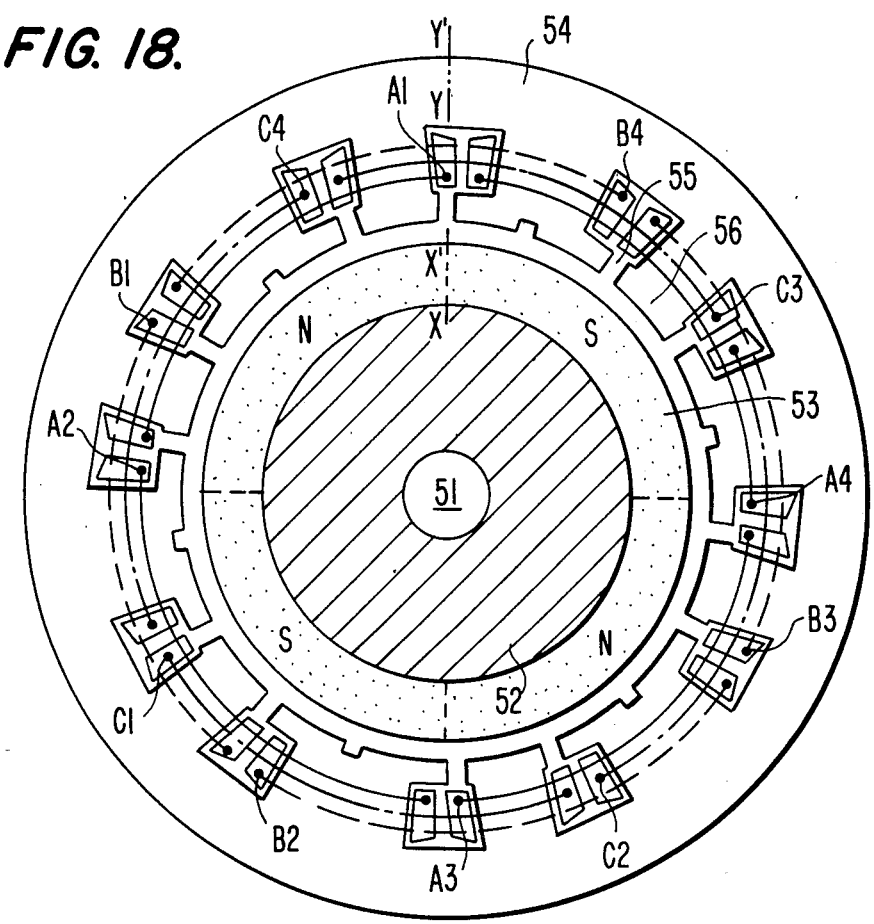
FIG. 18 is a schematic sectional view of still another embodiment of the rotating electric motor of the invention with the relationship T=3P.

FIG. 18 shows a schematic sectional view of further another embodiment of a invention with the relationship T=3P, which also corresponds to the conventional rotating electric motor shown in FIG. 3 and FIG. 4. In FIG. 18, a cylindrical permanent magnet 53 is fixed to the outer circumference of a rotor 52 made of magnetic material, and the permanent magnet 53 rotates with the rotor 52 around a rotary shaft 51. The permanent magnet 53 has 4 poles of alternating N and S poles positioned at intervals of an equal or angle of 90 degrees, that is, P=4. The distribution of the magnetic flux density of the permanent magnet 53 is the same as that shown in FIG. 6. The teeth 56 of an armature core 54, each of which is formed between two adjacent winding slots 55, are faced to the poles of the permanent magnet 53. The rotary shaft 51 of the rotor 52 is rotatably supported by the armature core 54. Therefore, the relative position between the teeth 56 of the armature core 54 and the poles of the permanent magnet 53 changes according to the rotation of the rotor 52.

Figure 19:
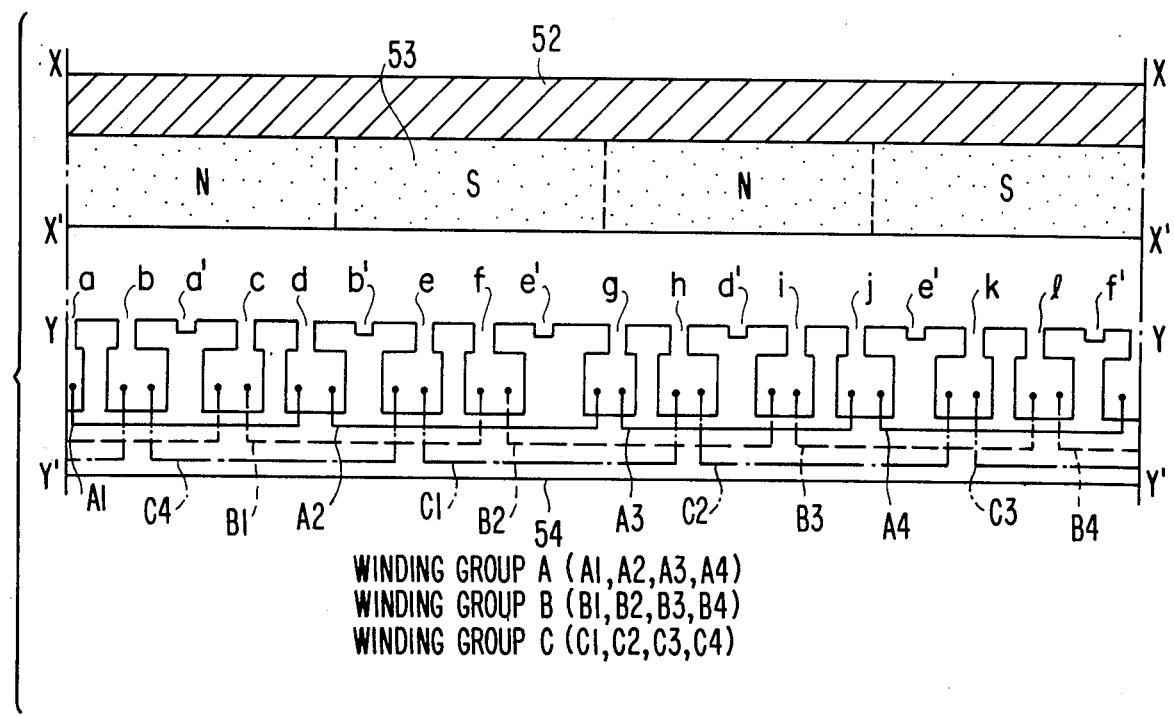
FIG. 19 is a development view of the rotating electric motor of FIG. 18 developed at the lines X-X' and Y-Y'.

FIG. 19 shows a development view of the brushless DC motor of the invention of FIG. 18 developed at the lines X-X' and Y-Y', when these lines are in a line. The armature core 54 has 12 winding slots a, b, c, d, e, f, g, h, i, j, k and l, and 12 teeth are provided between two adjacent winding slots, that is, T=12. The armature core 54 also has 6 dummy-slot portions a',b',c',d',e' and f' at the faces of some of the teeth opposed to the permanent magnet 53, and no coils are wound in the dummy-slot portions. Overlapping winding coils A1, A2, A3, A4, B1, B2, B3, B4, C1, C2, C3 and C4 are wound in the winding slots a to l. Each of the winding coils A1 to C4 encircles 3 of the teeth of the armature core 54. That is, A1 is wound in the winding slots a and d, A2 is wound in the winding slots d and g, A3 is wound in the winding slots g and j, A4 is wound in the winding slots j and a, B1 is wound in the winding slots c and f, B2 is wound in the winding slots f and i, B3 is wound in the winding slots i and l, B4 is wound in the winding slots l and c, C1 is wound in the winding slots e and h, C2 is wound in the winding slots h and k, C3 is wound in the winding slots k and b, and C4 is wound in the winding slots b and e. The winding coils A1,A2,A3 and A4 are connected in series to form a winding group A of the first phase, the winding coils B1,B2,B3 and B4 are connected in series to form a winding group B of the second phase, and the winding coils C1,C2,C3 and C4 are connected in series to form a winding group C of the third phase. As will be described later, the phase differences among the winding groups A,B and C are exactly equal to 120el degrees (electrical degrees), where 180el is equivlent to the 1 pole pitch (360/P) degrees. In FIG. 18, if P=4, then 180el is equivalent to 90 degrees (mechanical degrees), which is the same as that of the conventional motor of FIG. 3. Therefore, a torque accelerating the rotor 52 is obtained by supplying three phase currents to the three phase winding groups A, B and C. The electronic distributor 30 shown in FIG. 8 is also usable for the brushless DC motor of the invention of FIG. 18.

In FIG. 19, since the winding slots a to l are positioned at intervals of unequal angles, the effective pitches of the teeth are not the same. In the case of T=3P=12 (P=4), the standard effective pitch is D=(360/T)=30 degrees when all of the winding slots are positioned at intervals of an equal angle. So, a short-tooth has the effective pitch smaller than D, and a long-tooth has the effective pitch larger than D. In FIG. 19, the teeth a-b, c-d, e-f, g-h, i-j and k-l are short-teeth, and the teeth b-c,d-e,f-g, h-i,j-k and l-a are long-teeth. There are 6 short-blocks <a,b>,<c,d>,<e,f>,<g,h>,<i,j> and <k,l>, and there are 6 long-blocks <b,c>,<d,e>,<f,g>,<h,i>,<j,k> and <l,a>. Each of the short-blocks has only one short-tooth, and each of the long-blocks has only one long-tooth. The armature core 54 of the brushless DC motor of the invention shown in FIG. 18 and FIG. 19 has 6 pairs of short-blocks and long-blocks positioned alternately around the rotary shaft 51.

Each of the effective pitches of the short-teeth a-b, c-d, e-f, g-h, i-h and k-l is equal or nearly equal to (360/18)=20 degrees, each of the effective pitches of the long-teeth b-c, d-e, h-i and j-k is equal or nearly equal to (720/18)=40 degrees, the effective pitch of the long-tooth f-g is equal or almost equal to (1+5/4)20=45 degrees, and the effective pitch of the long-tooth l-a is equal or almost equal to (1+3/4)20=35 degrees. Each of the long-teeth b-c,d-e,f-g,h-i,j-k and l-a has one of dummy-slot portions a',b',c',d',e' and f' at the faces of the teeth opposed to the poles of the permanent magnet 53. The first slot-group is formed by the winding slots a,b,c,d,e and f and the dummy-slot portions a',b' and c', which are positioned sequentially at intervals of equal angles by the first pitch of 20 degree. The second slot-group is formed by the winding slots g,h,i,j,k and l and the dummy-slot portions d',e' and f', which are also positioned sequentially at intervals of the first pitch. The pitches between adjacent winding slots of the first slot-group and the second slot-group at the both sides are 35 or 45 degrees, each of which is not equal to an integral multiple of the first pitch of 20 degree.

Figure 20:
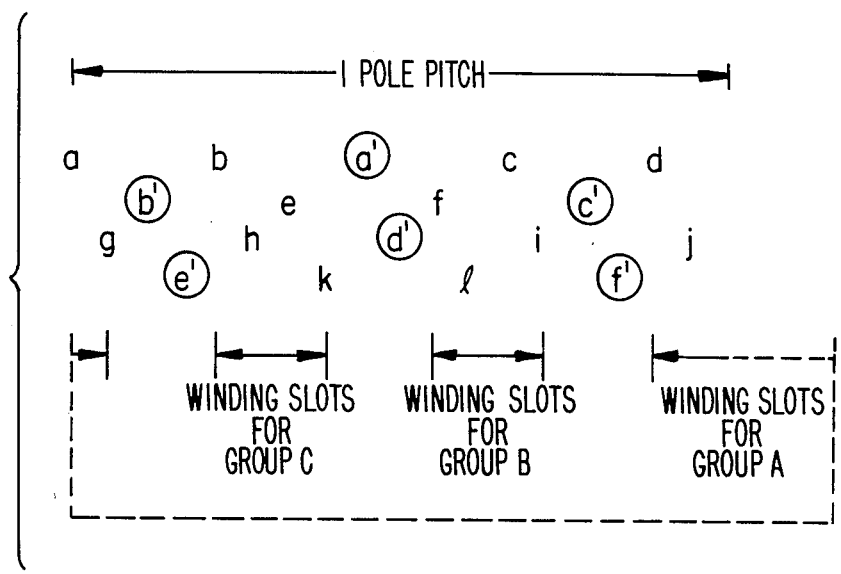
FIG. 20 is a phase diagram of the winding slots and the dummy-slot portions of the armature core with the period of the 1 pole pitch of the permanent magnet about the rotating electric motor of the invention shown in FIG. 18 and FIG. 19.

Next, the cogging torque of the embodiment of the invention shown in FIG. 18 will be explained hereinbelow. FIG. 20 shows phases of the winding slots a to l and the dummy-slot portions a' to f' of the armature core 54 with the period of 1 pole pitch of the permanent magnet 53. The winding slots a,d,g and j, where the winding coils A1,A2,A3 and A4 of the winding group A are wound, and the dummy-slot portions c' and f' are positioned at intervals of a phase difference of (1 pole pitch)/18. That is, the phases of the winding slots a,d,g and j and the dummy-slot portions c' and f' differ from each other by (1 pole pitch)/18, and the range of the phases of the winding slots a,d,g and j is smaller than (1 pole pitch)/3. Similarly, the winding slots c,f,i and l, where the winding coils B1,B2,B3 and B4 of the winding group B are wound, and the dummy-slot portions a' and d' are positioned at intervals of the same phase difference of (1 pole pitch)/18, and the range of the phases of the winding slots c,f,i and l is smaller than (1 pole pitch)/3. Similarly, the winding slots b,e,h and k, where the winding coils C1,C2,C3 and C4 of the winding group C are wound, and the dummy-slot portions b' and e' are positioned by the same phase difference of (1 pole pitch)/18, and the range of the phases of the winding slots b,e,h and k is smaller than (1 pole pitch)/3. Further, the phase differences among the winding slot group (a,d,g,j) for the winding group A, the winding slot group (c,f,i,l) for the winding group B and the winding slot group (b,e,h,k) for the winding group C are exactly equal to (1 pole pitch)/3. As the result of this, the phase differences among the three phase winding groups, A, B and C are exactly equal to 120el degrees, and a smooth torque is obtained by using the distributor 30 of FIG. 8.

Figure 21:
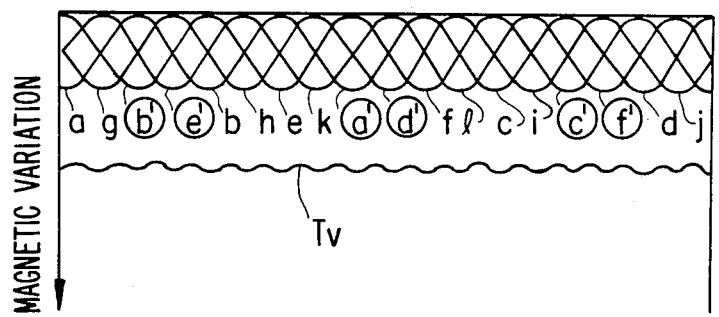
FIG. 21 is a diagram showing a composite magnetic variation of the rotating electeic motor of the invention shown in FIG. 18 and FIG. 19.

All of the phases of the winding slots a to l and the dummy-slot portions a' to f' are different from each other by the phase difference of (1 pole pitch)18, and it is expected that the composite magnetic variation with the period of 1 pole pitch becomes small. FIG. 21 shows waveforms of the magnetic variations of the winding slots a to l and the dummy-slot portions a' to f' and a waveform of the composite magnetic variation Tv of the armature cure 54. The magnetic variation of each of the winding slots and dummy-slot portions changes smoothly corresponding to the each opening width, and each of the dummy-slot portions, a',b',c',d',e' and f' has same magnetic effect as that of each of the winding slots a to l. Since the phases of the winding slots and the dummy-slot portions differ from each other by (1 pole pitch)/18, the composite magnetic variation Tv becomes very small. Comparing the composite magnetic variation Tv of FIG. 21 with the composite magnetic variation Tv' of FIG. 17, the Tv of the motor of the invention is much smaller than the Tv' of the conventional motor. Therefore, the embodiment of the brushless DC motor of the invention shown in FIG. 18 has a low cogging torque.

In the case of the above embodiment of FIG. 18, two slot-groups are provided in the armature core, but the construction of the rotating electric motor of the invention having reduced cogging torque is not limited to such a case. Generally speaking, the cogging torque can be reduced by providing a rotating electric motor which comprises a field permanent magnet member of a circular form and an armature core made of magnetic matirial, said magnet member having permanently magnetized N and S poles alternately positioned around a rotary shaft of said rotary electric motor, the number of said N and S poles being P which is an even number, said armature core having a plurality of teeth made between two adjacent winding slots where a plurality of overlapping winding coils of the polyphase winding groups are wound, the number of said teeth being T which is not less than 2P, and the number of the phases of said polyphase winding groups being H which is not less than 2, wherein at least one of said teeth has at least one dummy-slot portion, said armature core having at least first and second slot-groups, said dummy-slot portions and said winding slots in said first slot-group being positioned at intervals of equal or almost equal angles to the first pitch, said dummy-slot portions and said winding slots in said second slot-group being positioned at intervals of equal or almost equal angles to the first pitch, and the second pitch between adjacent winding slots of said first slot-group and said second slot-group being not equal to an integral multiple of said first pitch.

It is preferable that the ratio of the second pitch to the first pitch is equal to $(1+N/M)$ or $(1-N/M)$, where M is an integer not less than 2 and N is an integer not less than 1 and not equal to an integral multiple of M. It is also preferable that said armature core has at least a pair of short-blocks and long-blocks alternately positioned around said rotary shaft, that each of said short-blocks has at least one short-tooth and no long-tooth, and that each of said long-blocks has at least one long-tooth and no short-tooth, where each of the effective pitches of said short-teeth is smaller than $D=(360/T)$ degrees, and each of the effective pitches of said long-teeth is larger than D. It is also preferable that the number of said teeth in each of said short-blocks is not less than the number of said teeth in each of said long-blocks.

Some embodiments according to the invention have been described above, but it should be understood that they are merely for the understanding of the present invention but not for the limitation of the scope of the invention. Various changes and modifications are made without departing from the scope of the invention defined in the appended claims.

What is claimed is:

1. A rotating electric motor comprising:
   a field permanent magnet member substantially of a circular form having permanently magnetized N and S poles alternately positioned around a rotary shaft of said rotary electric motor, said magnet member having a number of poles P which is an even number at least equal to 4; and
   an armature core of a magnetic material having a plurality of teeth each disposed between an adjacent pair of a plurality of winding slots where a plurality of overlapping winding coils of polyphase winding groups are wound, said teeth being opposed to the poles of said magnet member, said core having a number of said teeth T which is an integral multiple of P and at least equal to 2P, and said polyphase winding groups having a number of phases H which is at least equal to 2;
   wherein said teeth are composed of short-teeth each having an effective pitch smaller than $D=360/T$ and long-teeth each having an effective pitch larger than D, wherein the effective pitch of a tooth is defined by an angle between centers of entrance parts of adjacent pairs of slots forming the tooth;
   wherein said long-teeth are positioned at intervals of an equal angle, and said core has a number of said long-teeth which is less than or equal to T/2 and other than an integral multiple of P; and
   wherein each of said long-teeth has a dummy-slot portion opposed to said magnet member and an effective pitch defined by an angle between centers of entrance parts of said dummy-slot and each of adjacent pairs of slots forming each of said long-teeth being equal to the effective pitch of each of said short-teeth.

2. A rotating electric motor as claimed in claim 1, wherein the number of said long-teeth is an integral multiple of H.

3. A rotating electric motor as claimed in claim 2, wherein the number of said long-teeth is equal to H.

4. A rotating electric motor as claimed in claim 2, wherein H=3.

5. A rotating electric motor as claimed in claim 1, wherein a ratio of the effective pitch of each of said short-teeth to the effective pitch of each of said long-teeth is R:R+1, wherein R is an integer.

6. A rotating electric motor as claimed in claim 1, wherein T is an integral multiple of H multiplied by P.

7. A rotating electric motor as claimed in claim 6, wherein H=3.

8. A rotating electric motor as claimed in claim 7, wherein T=6P.

9. A rotating electric motor as claimed in claim 7, wherein T=3P.

10. A rotation electric motor comprising:

a field permanent magnet member substantially of a circular form having permanently magnetized N and S poles alternately positioned around a rotary shaft of said rotary electric motor, said magnet member having a number of poles P which is an even number at least equal to 4; and an armature core of a magnetic material having a plurality of teeth each disposed between an adjacent pair of a plurality of winding slots where a plurality of overlapping winding coils of polyphase winding groups are wound, said teeth being opposed to the poles of said magnet member, said core having a number of said teeth T which is an integral multiple of P and at least equal to 2P, and said polyphase winding groups having a number of phases H which is at least equal to 2;

wherein said teeth are composed of short-teeth each having an effective pitch smaller than $D-360/T$ and long-teeth each having an effective pitch larger than D, wherein the effective pitch of a tooth is defined by an angle between centers of entrance parts of adjacent pairs of slots forming the tooth;

wherein said short-teeth are positioned at intervals of an equal angle, and said core has a number of said short-teeth which is less than or equal to T/2 and other than an integral multiple of P; and wherein each of said long-teeth has a dummy-slot portion opposed to said magnet member and an effective pitch defined by an angle between centers of entrance parts of said dummy-slot and each of adjacent pairs of slots forming each of said long-teeth being equal to the effective pitch of each of said short-teeth.

11. A rotating electric motor as claimed in claim 10, wherein the number of said short-teeth is an integral multiple of H.

12. A rotating electric motor as claimed in claim 11, wherein the number of said short-teeth is equal to H.

13. A rotating electric motor as claimed in claim 11, wherein $H=3$.

14. A rotating electric motor as claimed in claim 10, wherein a ratio of the effective pitch of each of said short-teeth to the effective pitch of each of said long-teeth is $R:R+1$, where R is an integer.

15. A rotating electric motor as claimed in claim 10, wherein T is an integral multiple of H multiplied by P.

16. A rotating electric motor as claimed in claim 15, wherein $H=3$.

17. A rotating electric motor as claimed in claim 16, wherein $T=6P$.

18. A rotating electric motor as claimed in claim 16, wherein $T=3P$.

19. A rotating electric motor comprising:
a field permanent magnet member substantially of a circular form having permanently magnetized N and S poles alternately positioned around a rotary shaft of said rotary electric motor, said magnet member having a number of poles P which is an even number at least equal to 4; and an armature core of a magnetic material having a plurality of teeth each disposed between an adjacent pair of a plurality of winding slots where a plurality of overlapping winding coils of polyphase winding groups are wound, said teeth being opposed to the poles of said magnet member, said core having a number of said teeth T which is an integral multiple of P and at least equal to 2P, and said polyphase winding groups have a number of phases H which is at least equal to 2;

wherein a group of sequential L teeth of said armature core has a pitch which is defined by an angle between centers of entrance parts of two winding slots positioned at either side of the group of sequential L teeth and equal to $(360/P)Q$ degrees, wherein L is an integer larger than T/P and Q is an integer at least equal to 2;

wherein a ratio of a smallest effective pitch of a tooth of said sequential L teeth to an effective pitch of a m-th tooth of said sequential L teeth is $R:R+Vm$, wherein the effective pitch of a tooth is defined by an angle between centers of entrance parts of an adjacent pair of winding slots forming the tooth, R being a positive integer, Vm being an integer including Q; and wherein sum of Vm from $m=1$ to $m=L$ is W which is other than an integral multiple of Qd, where Qd is a divisor of Q and at least equal to 2.

20. A rotating electric motor as claimed in claim 19, wherein $W=Qd-1$.

21. A rotating electric motor as claimed in claim 19, wherein $W=Qd+1$.

22. A rotating electric motor as claimed in claim 19, wherein $W=Qm-1$, where Qm is an integral multiple of Q.

23. A rotating electric motor as claimed in claim 19, wherein $W=Qm+1$, where Qm is an integral multiple of Q.

24. A rotating electric motor as claimed in claim 19, wherein $Q=P$.

25. A rotating electric motor as claimed in claim 19, wherein $H=3$.

26. A rotating electric motor as claimed in claim 19, wherein Q is other than an integral multiple of H.

27. A rotating electric motor as claimed in claim 19, wherein at least two of said sequential L teeth respectively have dummy-slot portions opposed to said magnet member.

28. A rotating electric motor as claimed in claim 27, wherein centers of entrance parts of said dummy-slot portions and said winding slots in said group of said sequential L teeth are positioned at intervals of an equal angle.

29. A rotating electric motor comprising:
a field permanent magnet member substantially of a circular form having permanently magnetized N and S poles alternately positioned around a rotary shaft of said rotary electric motor, said magnet member having a number of poles P which is an even number at least equal to 4; and an armature core of a magnetic material having a plurality of teeth each disposed between an adjacent pair of a plurality of winding slots where a plurality of overlapping winding coils of polyphase winding groups are wound, said teeth being opposed to the poles of said magnet member, said core having a number of said teeth T which is an integral multiple of P and at least equal to 2P, and said polyphase winding groups having a number of phases H which is at least equal to 2;

wherein at least two of said teeth respectively have dummy-slot portions opposed to said magnet member;

wherein said armature core has at least first and second slot-groups adjacent to each other, centers of entrance parts of said dummy-slot portions and said winding slots in said first slot-group being positioned at intervals of a first pitch, centers of entrance parts of said dummy-slot portions and said winding slots in said second slot-group being positioned at intervals of the first pitch; and wherein a second pitch defined by an angle between centers of entrance parts of adjacent winding slots of said first slot-group and said second slot-group is other than an integral multiple of said first pitch.

30. A rotating electric motor as claimed in claim 29, wherein a ratio of the second pitch to the first pitch is equal to one of either $(1+N/M)$ or $(1-N/M)$, where M is an integer at least equal to 2 and N is a positive integer other than an integral multiple of M.

* * * * *